United States Patent
Watanabe

(10) Patent No.: US 8,488,978 B2
(45) Date of Patent: Jul. 16, 2013

(54) OPTICAL SIGNAL PROCESSOR

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 38 days.

(21) Appl. No.: 13/200,365

(22) Filed: Sep. 23, 2011

(65) Prior Publication Data

US 2012/0020665 A1    Jan. 26, 2012

Related U.S. Application Data

(63) Continuation of application No. PCT/JP2009/058412, filed on Apr. 28, 2009.

(51) Int. Cl.
*H04B 10/04* (2006.01)

(52) U.S. Cl.
USPC ............. 398/183; 398/186; 398/79; 398/176; 359/326; 359/328; 359/332; 385/24; 385/27; 385/11

(58) Field of Classification Search
USPC ................. 398/173, 175, 176, 177, 178, 180, 398/79, 65, 152, 214, 81, 147, 158, 159, 398/160, 33, 38, 181, 182, 183, 185, 186, 398/188, 200, 201; 359/326, 332, 344, 237, 359/238, 239, 328; 385/24, 27, 122, 123, 385/39, 11, 15

See application file for complete search history.

(56) References Cited

U.S. PATENT DOCUMENTS

| | | | |
|---|---|---|---|
| 5,798,853 A | | 8/1998 | Watanabe |
| 6,335,819 B1 * | | 1/2002 | Cho et al. ....................... 359/333 |
| 6,775,478 B2 * | | 8/2004 | Suzuki et al. .................... 398/75 |
| 6,963,436 B2 * | | 11/2005 | Watanabe et al. ............ 359/239 |
| 2004/0141749 A1 * | | 7/2004 | Otani et al. ..................... 398/83 |
| 2005/0099674 A1 | | 5/2005 | Watanabe |
| 2006/0045445 A1 | | 3/2006 | Watanabe |
| 2006/0051100 A1 | | 3/2006 | Watanabe |
| 2007/0230518 A1 | | 10/2007 | Watanabe |
| 2008/0165365 A1 | | 7/2008 | Watanabe |
| 2008/0232808 A1 | | 9/2008 | Watanabe |
| 2010/0183303 A1 | | 7/2010 | Okabe et al. |
| 2012/0020665 A1 | | 1/2012 | Watanabe |
| 2012/0189308 A1 * | | 7/2012 | Watanabe ....................... 398/79 |

FOREIGN PATENT DOCUMENTS

| | | |
|---|---|---|
| EP | 1 944 592 | 7/2008 |
| EP | 1 973 246 | 9/2008 |
| EP | 2 031 784 | 3/2009 |

(Continued)

OTHER PUBLICATIONS

Patent Abstracts of Japan, Publication No. 2006-184851, Published Jul. 13, 2006.

(Continued)

*Primary Examiner* — Hanh Phan

(74) *Attorney, Agent, or Firm* — Staas & Halsey LLP

(57) ABSTRACT

A probe light source produces probe light having a second wavelength different from a first wavelength of signal light. To a light modulator, the probe light and signal light produced from the probe light source are supplied. The light modulator multiplexes the probe light and signal light produced from the probe light source, and supplies it to a nonlinear optical medium. Further, the light modulator modulates the probe light by an intensity change of the signal light in the nonlinear optical medium, and outputs modulated light having the second wavelength based on the data of the signal light.

18 Claims, 21 Drawing Sheets

FOREIGN PATENT DOCUMENTS

| | | |
|---|---|---|
| EP | 2 199 846 | 6/2010 |
| JP | 2003-241243 | 8/2003 |
| JP | 3566096 | 6/2004 |
| JP | 2004-341035 | 12/2004 |
| JP | 2006-184851 | 7/2006 |
| JP | 2007-047827 | 2/2007 |
| JP | 2007-264319 | 10/2007 |
| JP | 2008-170525 | 7/2008 |
| JP | 2008-233544 | 10/2008 |
| WO | WO 2009/047856 | 4/2009 |
| WO | 2010/125657 | 11/2010 |

OTHER PUBLICATIONS

Patent Abstracts of Japan, Publication No. 2007-264319, Published Oct. 11, 2007.

Patent Abstracts of Japan, Publication No. 2000-075330, Published Mar. 14, 2000.

Patent Abstracts of Japan, Publication No. 2008-170525, Published Jul. 24, 2008.

Patent Abstracts of Japan, Publication No. 2008-233544, Published Oct. 2, 2008.

Patent Abstracts of Japan, Publication No. 2007-047827, Published Feb. 22, 2007.

Patent Abstracts of Japan, Publication No. 2004-341035, Published Dec. 2, 2004.

Patent Abstracts of Japan, Publication No. 2003-241243, Published Aug. 27, 2003.

B.E. Olsson et al., "WDM to ODTM Multiplexing Using an Ultrafast All-Optical Wavelength Converter", IEEE Photonics Technology Letters, vol. 13, No. 9, p. 1005-1007, May 25, 2009.

Japanese Office Action issued Dec. 25, 2012 in corresponding Japanese Patent Application No. 2011-511224.

* cited by examiner

OPTICAL SIGNAL PROCESSOR

This application is a continuing application, filed under 35 U.S.C. §111(a), of International Application PCT/JP2009/058412, filed on Apr. 28, 2009.

FIELD

The embodiment discussed herein is related to an optical signal processor that moves signal light to another light wave.

BACKGROUND

In a future optical network, for example, processes of branch insertion or switching of signal light need to be performed in a device installed in a place separated from repeater optical nodes or terminal devices, while using as a base a conventional optical communication system. In the case of terminal devices, for example, the above-described processes are performed by using a method for converting electrical signals as data into optical signals by light modulators. However, in the repeater optical node of future optical network, the conversion from electrical signals to optical signals is used as in the above-described terminal device. In such a case, transmitted optical signals are converted into electrical signals once, and the signals are electrically processed (waveform shaping). Then, the electrical signals need to be converted into optical signals again. In this case, a configuration becomes complicated and loss generated during opto-electronic conversion is compensated, and as a result, large power is needed.

As a technique related to the above, known is a technique of realizing a high-speed switching by optical signals in high switching efficiency over a sufficiently wide wavelength range (see, for example, Japanese Laid-open Patent Publication No. 2006-184851). Further, known is a technique of efficiently shaping a waveform of a deteriorated optical signal (see, for example, Japanese Laid-open Patent Publication No. 2007-264319). Further, known are an apparatus and system for optical phase conjugation and wavelength conversion usable as a converter that is wide in a conversion band and has no dependence on polarization (see, for example, Japanese Patent No. 3566096).

As described above, in a repeater optical node of an optical network, when data of optical signals is moved to another light wave in a process of branch insertion or switching of signal light, since opto-electronic conversion is performed once, large power loss is generated.

SUMMARY

According to one aspect of the present invention, an optical signal processor includes: a light source to supply light having a wavelength different from that of signal light; and a light modulator to multiplex the light produced from the light source and the signal light to supply the multiplexed light and signal light to a nonlinear optical medium, and modulate the light by an intensity change of the signal light in the nonlinear optical medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
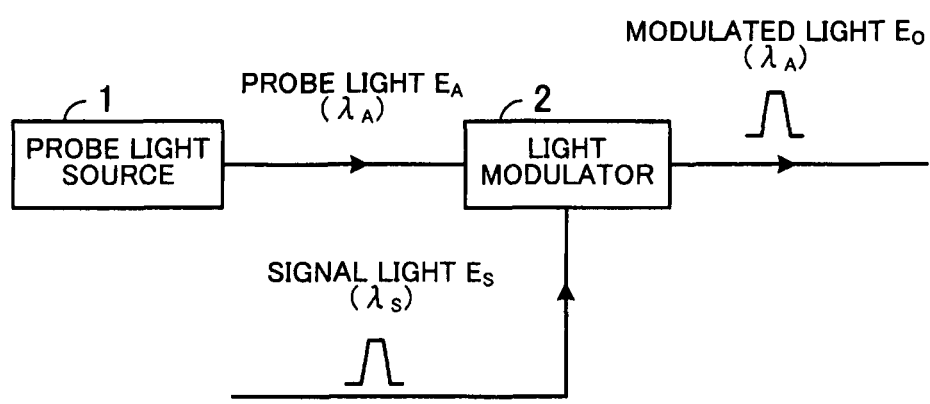
FIG. 1 illustrates an optical signal processor according to a first embodiment.

Preferred embodiments of the present invention will now be described in detail below with reference to the accompanying drawings, wherein like reference numerals refer to like elements throughout.

FIG. 1 illustrates an optical signal processor according to the first embodiment. As illustrated in FIG. 1, the optical signal processor includes a probe light source 1 and a light modulator 2.

The probe light source 1 supplies probe light $E_A$ having a wavelength $\lambda_A$ different from a wavelength $\lambda_S$ of signal light $E_S$. The probe light $E_A$ may be continuous wave (CW) light, or an optical pulse train.

To the light modulator 2, the probe light $E_A$ produced from the probe light source 1 and the signal light $E_S$ are supplied. The light modulator 2 multiplexes the probe light $E_A$ produced from the probe light source 1 and the signal light $E_S$ and supplies it to a nonlinear optical medium. Further, the light modulator 2 modulates the probe light $E_A$ by an intensity change of the signal light $E_S$ in the nonlinear optical medium, and outputs modulated light $E_O$ having a wavelength $\lambda_A$ based on data of the signal light $E_S$.

As described above, the optical signal processor modulates the probe light $E_A$ having a wavelength $\lambda_A$ by the intensity change of the signal light $E_S$ having a wavelength $\lambda_S$ in the nonlinear optical medium. As a result, since data of the signal light $E_S$ having a wavelength $\lambda_S$ is moved to a light wave having a wavelength $\lambda_A$ and is output without opto-electronic conversion, power loss can be suppressed.

A second embodiment will be described in detail below with reference to the accompanying drawing. According to the second embodiment, the optical signal processor waveform-shapes signal light and supplies it to the light modulator.

Figure 2:
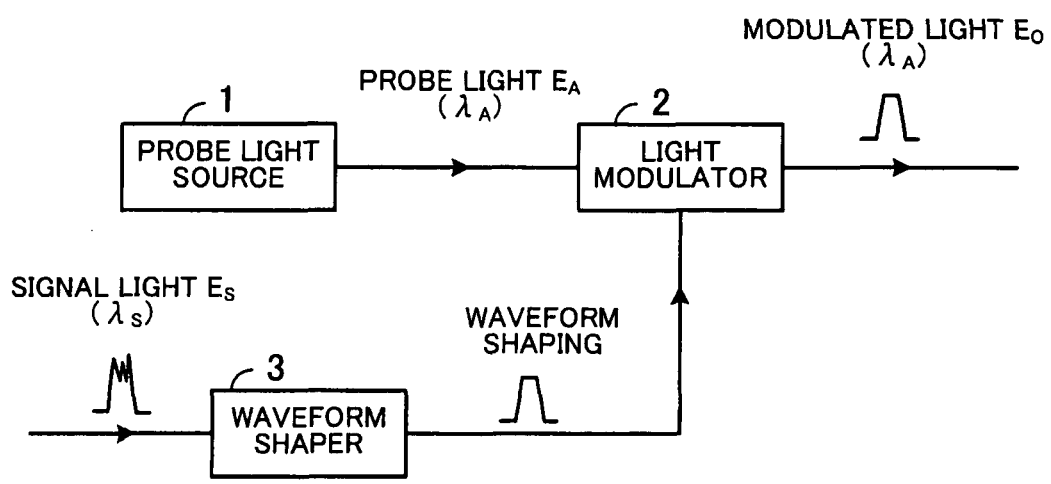
FIG. 2 illustrates the optical signal processor according to a second embodiment.

FIG. 2 illustrates the optical signal processor according to the second embodiment. As illustrated in FIG. 2, the optical signal processor includes a waveform shaper 3 as compared with that of FIG. 1. In FIG. 2, the same circuit elements as those in FIG. 1 are indicated by the same reference numerals as in FIG. 1, and the description will not be repeated here.

The signal light $E_S$ includes noise due to transmission, branch insertion, or switching in an optical network. Further, waveform distortion occurs in the signal light $E_S$. The waveform shaper 3 suppresses the noise and waveform distortion included in the signal light $E_S$, and supplies them to the light modulator 2. This process permits the waveform shaper 3 to suppress the modulated light $E_O$ produced from the light modulator 2 from including the noise and waveform distortion.

Figure 3:
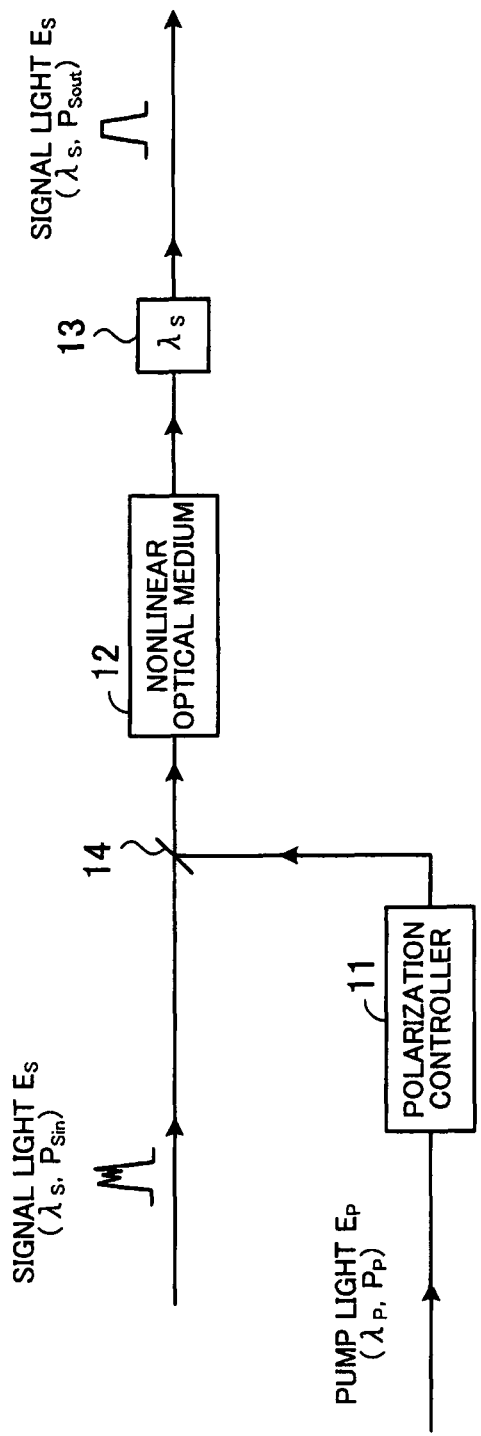
FIG. 3 illustrates a first waveform shaper.

An optical circuit example of the waveform shaper 3 will be described below, and then an optical circuit example of the light modulator 2 will be described. FIG. 3 illustrates a first waveform shaper. As illustrated in FIG. 3, the waveform shaper 3 has a polarization controller 11, a nonlinear optical medium 12, an optical filter 13, and an optical coupler 14.

To the polarization controller 11, pump light $E_P$ is supplied. A wavelength and power of the pump light $E_P$ are a wavelength $\lambda_P$ and power $P_P$, respectively. For example, the polarization controller 11 controls a polarization state of the pump light $E_P$ so that efficiency of a nonlinear optical effect in the nonlinear optical medium 12 may be optimal.

The signal light $E_S$ and the pump light $E_P$ are combined by the optical coupler 14, and supplied to the nonlinear optical medium 12. A wavelength and power of the signal light $E_S$ are a wavelength $\lambda_S$ and power $P_{Sin}$, respectively. In the nonlinear optical medium 12, the signal light $E_S$ is amplified by the pump light $E_P$. A wavelength of the signal light $E_S$ produced from the nonlinear optical medium 12 is not changed with that of the signal light $E_S$ supplied to the nonlinear optical medium 12, and it is a wavelength $\lambda_S$. Power of the signal light $E_S$ produced from the nonlinear optical medium 12 is power $P_{Sout}$.

On the output side of the nonlinear optical medium 12, an optical filter 13 to extract the signal light $E_S$ is provided. The optical filter 13 to extract the signal light $E_S$ may include an optical band-pass filter, a band-stop filter to stop every wavelength component (including a pump light) except that of the signal light $E_S$, and a wavelength division multiplexing (WDM) optical coupler.

In the case where the nonlinear optical medium 12 is a second-order or tertiary nonlinear optical medium, an optical parametric effect such as four-wave mixing (FWM) or three-wave mixing (TWM) is caused by the pump light $E_P$ in the nonlinear optical medium 12, and as a result, the signal light $E_S$ is subjected to optical parametric amplification. When the power $P_P$ of the pump light $E_P$ is sufficiently higher than the power $P_{Sin}$ of the signal light $E_S$, a gain of the above-described optical parametric amplification is constant irrespective of the power $P_{Sin}$ of the signal light $E_S$.

However, when the power $P_{Sin}$ of the signal light $E_S$ becomes large and the power $P_P$ of the pump light $E_P$ is not assumed to be sufficiently higher than the power $P_{Sin}$ of the signal light $E_S$, a phenomenon called "depletion" occurs, in which the power $P_P$ of the pump light $E_P$ is attenuated in the nonlinear optical medium 12.

Figure 4A:
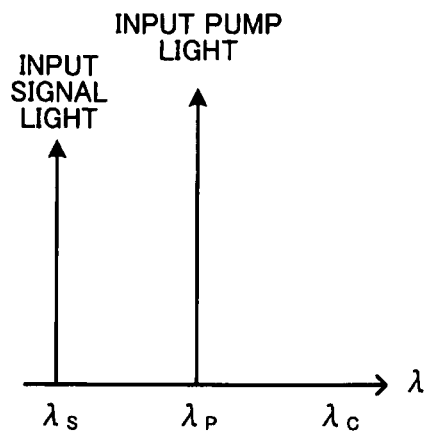
FIGS. 4A and 4B illustrate depletion.
Figure 4B:
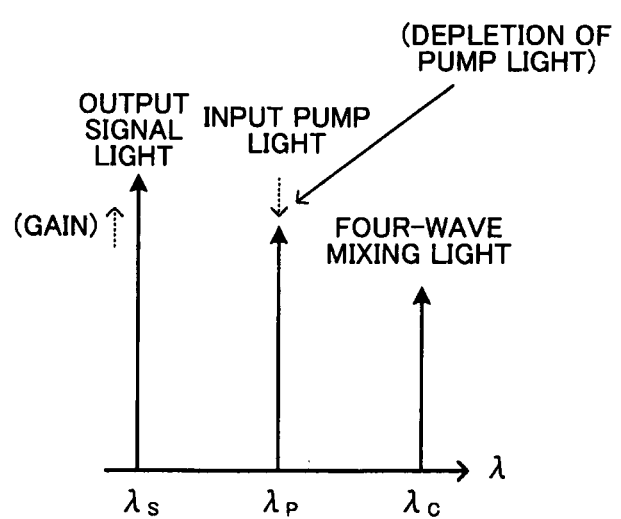

FIGS. 4A and 4B illustrate the depletion. Here, as illustrated in FIG. 4A, the signal light $E_S$ having a wavelength $\lambda_S$ and the pump light $E_P$ having a wavelength $\lambda_P$ is assumed to be supplied to an optical fiber as the nonlinear optical medium 12. Note that the wavelength $\lambda_P$ of the pump light $E_P$ may be longer than or shorter than the wavelength $\lambda_S$ of the signal light $E_S$.

As illustrated in FIG. 4B, for example, the signal light $E_S$ causes idler light (wavelength: $\lambda_C$) corresponding to the signal light $E_S$ by the four-wave mixing in the interaction between the signal light $E_S$ and the pump light $E_P$. Power of the signal light $E_S$ and the idler light is amplified in the four-wave mixing. At this time, a part of energy of the pump light $E_P$ is approximately equally given to the signal light $E_S$ and the idler light. In addition, a frequency $\omega_S$ of the signal light $E_S$, a frequency $\omega_P$ of the pump light $E_P$, and a frequency $\omega_C$ of the idler light satisfy the following formula (1).

$$\omega_P - \omega_C = \omega_S - \omega_P \neq 0 \tag{1}$$

Here, for example, when an optical fiber is used as the nonlinear optical medium 12, a length thereof is assumed to be L and loss thereof is assumed to be $\alpha$. Further, in the optical fiber, polarization states of all light waves are assumed to be equal to each other, and the power $P_P$ of the pump light $E_P$ is assumed to be sufficiently larger than the power $P_{Sin}$ of the signal light $E_S$ and the power of the idler light. As one example, when the wavelength $\lambda_P$ of the pump light $E_P$ is adjusted to a zero dispersion wavelength $\lambda_0$ of the optical fiber, the signal light $E_S$ produced from the optical fiber approximately acquires an optical parametric gain $G_S$ represented in the following formula (2).

$$G_S = \exp(-\alpha L)[1 + \phi^2(L)] \tag{2}$$

Here, $\phi(L)$ represents a nonlinear optical phase shift, and is given by the following formula (3).

$$\phi(L) = \gamma P_P(0) l(L) \tag{3}$$

Here, $P_P(0)$ represents power (input power) of the pump light $E_P$. A right formula $l(L)$ of $P_P(0)$ represents a nonlinear interaction length, $\gamma$ represents a third-order nonlinear constant, and they are given by the following formula (4) and (5), respectively.

$$l(L) = (1 - e^{-\alpha L})/\alpha L \tag{4}$$

$$\gamma = \omega n_2 / c A_{eff} \tag{5}$$

Here, $n_2$ and $A_{eff}$ represent a nonlinear refractive index and effective mode-field cross-sectional area in the optical fiber, respectively.

As represented in the above-described formula (2) to (5), the optical parametric gain $G_S$ nonlinearly changes with respect to a product of a nonlinear constant, input power of the pump light $E_P$, and a nonlinear interaction length. In particular, the optical parametric gain $G_S$ is proportional to a square of the product of the nonlinear constant, the input power of the pump light $E_P$, and the nonlinear interaction length under conditions. Here, generation efficiency of the optical parametric effect depends strongly on polarization states of light waves interacting with each other. Specifically, when the polarization states of light waves supplied to the optical fiber are the same with each other, generation efficiency of the four-wave mixing is maximized. On the other hand, when the polarization states of light waves are orthogonal to each other, the four-wave mixing is hardly caused. Accordingly, when input power of the pump light $E_P$ is sufficiently large, the signal light $E_S$ is selectively subjected to the optical parametric amplification in the same polarization direction as that of the pump light $E_P$.

In the above-described model, when the input power of the signal light $E_S$ supplied to the optical fiber is made large and the power $P_P$ of the pump light $E_P$ is not made sufficiently larger than the power $P_{Sin}$ of the signal light $E_S$, the optical parametric gain $G_S$ is gradually saturated. In particular, when caused is a state called the depletion in which the power $P_P$ of the pump light $E_P$ is reduced in the optical fiber, the optical parametric gain Gs is rapidly saturated.

When the depletion of the pump light $E_P$ occurs in the nonlinear optical medium 12, a gain thereof is saturated. As a result, the power $P_{Sout}$ of the signal light $E_S$ produced from the nonlinear optical medium 12 is prevented from being larger than a predetermined level even if increasing the power $P_{Sin}$ of the signal light $E_S$, and the nonlinear optical medium 12 operates as an optical limiter amplifier. In the optical limiter amplifier, even if the power $P_{Sin}$ of the supplied signal light $E_S$ varies, the variation of the output power $P_{Sout}$ is reduced. Accordingly, the waveform shaper 3 capable of suppressing (particularly suppressing noise of a "1" level) intensity noise of the signal light $E_S$ can be realized. In addition, the intensity noise is also referred to as amplitude noise.

As can be seen from the above discussion, in the waveform shaper 3 of FIG. 3, when the power $P_{Sin}$ of the supplied signal light $E_S$ is enlarged to the level where the depletion of the pump light $E_P$ occurs (specifically depending on individual cases), thereby realizing the optical limiter amplifier.

The wavelength $\lambda_P$ of the pump light $E_P$ may be set to the side of a wavelength longer than a zero dispersion wavelength of the optical fiber, and at the same time, phase matching may be taken by using a nonlinear phase shift. This permits efficiency of the optical parametric amplification to be improved as compared with a case of being represented by the above-described formula (2).

Although not illustrated in FIG. 3, for example, the waveform shaper 3 has a power controller that is provided on the input side of the nonlinear optical medium 12 and that controls the power $P_P$ of the pump light $E_P$ so as to acquire a predetermined gain in the nonlinear optical medium 12, and a power controller that is provided on the input side of the nonlinear optical medium 12 and that controls the power $P_{Sin}$ of the signal light $E_S$ so as to saturate a gain due to the pump light $E_P$ in the nonlinear optical medium 12, and realizes operations of the optical limiter amplifier. Based on the operations of the optical limiter amplifier, amplitude fluctuations of the signal light $E_S$ can be suppressed. In short, the waveform shaper can realize waveform shaping and suppression of the amplitude noise of the signal light $E_S$.

The optical parametric amplification can be realized, for example, by using the four-wave mixing in the third-order nonlinear optical medium of the optical fiber and the three-wave mixing in the second-order nonlinear optical medium of a periodically-poled LN (LiNbO$_3$) waveguide.

Figure 5:
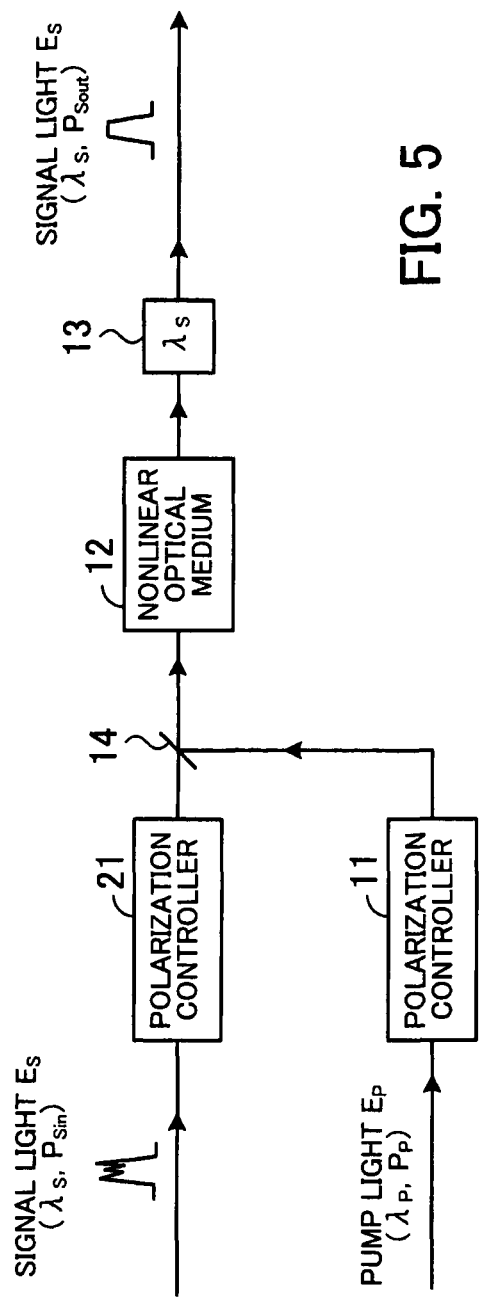
FIG. 5 illustrates a second waveform shaper.

FIG. 5 illustrates a second waveform shaper. The waveform shaper 3 illustrated in FIG. 5 relaxes dependency to a polarization state of the supplied signal light $E_S$. In FIG. 5, the same circuit elements as those in FIG. 3 are indicated by the same reference numerals as in FIG. 3, and the description will not be repeated here.

As illustrated in FIG. 5, the waveform shaper 3 has a polarization controller 21. The signal light $E_S$ supplied to the nonlinear optical medium 12 may have fluctuations through transmission of an optical network. The polarization controller 21 stabilizes the signal light $E_S$ supplied to the nonlinear optical medium 12 to a predetermined polarization state. The high-speed polarization controller 21 can be realized, for example, by using a fiber-squeezer polarization controller and a LiNbO$_3$ (LN) optical phase modulator.

The polarization controller 11 controls a polarization state of the pump light $E_P$ so that efficiency of the nonlinear optical effect may be optimized in the nonlinear optical medium 12, for example, with respect to the signal light $E_S$ stabilized to a predetermined polarization state.

Figure 6:
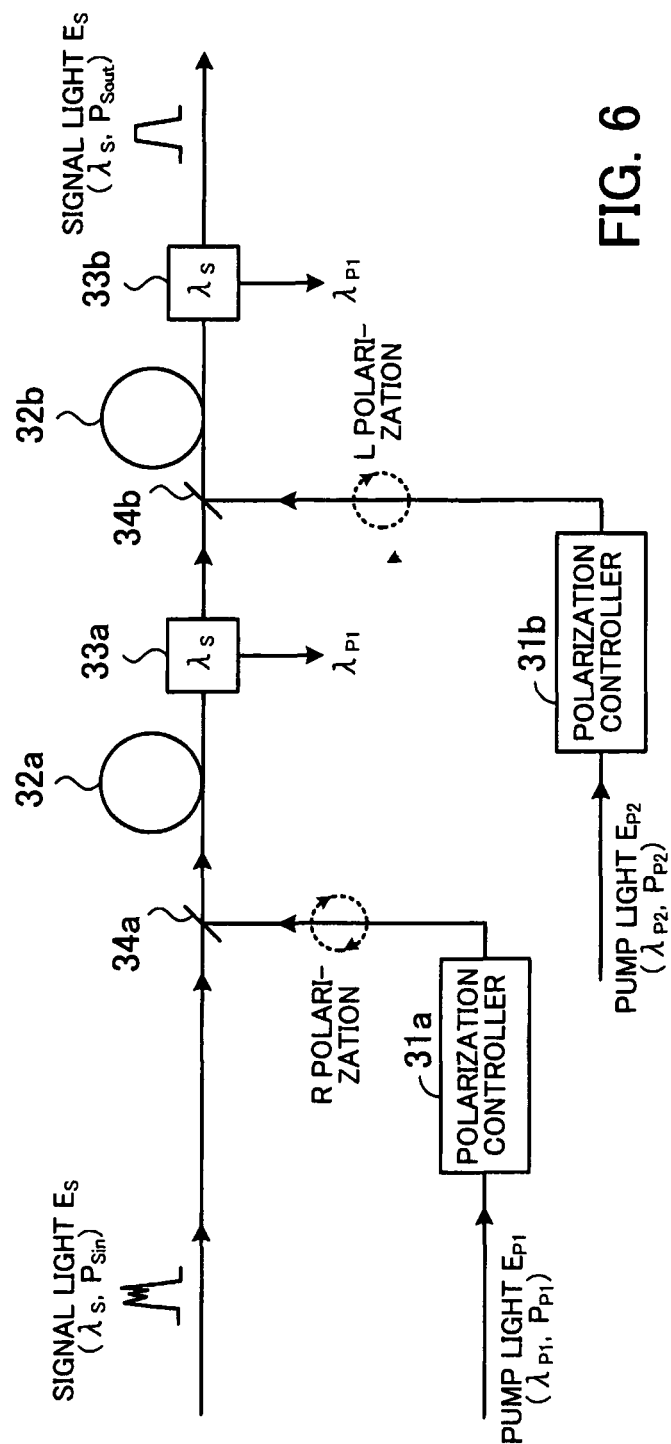
FIG. 6 illustrates a third waveform shaper.

FIG. 6 illustrates a third waveform shaper. As illustrated in FIG. 6, the waveform shaper 3 has polarization controllers 31a and 31b, optical fibers 32a and 32b, optical filters 33a and 33b, and optical couplers 34a and 34b. The waveform shaper 3 illustrated in FIG. 6 relaxes dependency to a polarization state of the supplied signal light $E_S$ by performing the optical parametric amplification by pump light whose polarization states are orthogonal to each other.

The signal light $E_S$ having a wavelength $\lambda_S$ and power $P_{Sin}$ and the pump light $E_{P1}$ having a wavelength $\lambda_{P1}$ and power $P_{P1}$ different from those of the signal light $E_S$ are multiplexed by the optical coupler 34a and supplied to the optical fiber 32a as a nonlinear optical medium. The pump light $E_{P1}$ is controlled to a specific polarization state by the polarization controller 31a, and is supplied to the optical fiber 32a. Here, suppose that the pump light $E_{P1}$ is controlled to right-handed circularly polarized light (R polarization).

The signal light $E_S$ is nonlinearly amplified by the pump light $E_{P1}$ in the optical fiber 32a. A wavelength of the signal light $E_S$ produced from the optical fiber 32a is not changed from that of the signal light $E_S$ supplied to the optical fiber 32a, and it is a wavelength $\lambda_S$.

On the output side of the optical fiber 32a, an optical filter 33a that extracts a wavelength $\lambda_S$ component of the signal light $E_S$ is provided. The optical filter 33a that extracts the signal light $E_S$ may include a band-stop filter that stops every wavelength component (pump light $E_{P1}$) except that of the signal light $E_S$, and a WDM optical coupler.

The signal light $E_S$ nonlinearly amplified by the pump light $E_{P1}$ in the optical fiber 32a is multiplexed with the pump light $E_{P2}$ having a wavelength $\lambda_{P2}$ and power $P_{P2}$ different from those of the signal light $E_S$ by the optical coupler 34b, and is supplied to the optical fiber 32b.

The pump light $E_{P2}$ is controlled by the polarization controller 31b to a polarization state that is orthogonal to that of the pump light $E_{P1}$, and is supplied to the optical fiber 32b. Here, suppose that the pump light $E_{P2}$ is controlled to left-handed circularly polarized light (L polarization).

The signal light $E_S$ supplied to the optical fiber 32b as a nonlinear optical medium is nonlinearly amplified by the pump light $E_{P2}$ in the optical fiber 32b. A wavelength of the signal light $E_S$ produced from the optical fiber 32b is not changed from that of the signal light $E_S$ supplied to the optical fiber 32b, and it is a wavelength $\lambda_S$.

On the output side of the optical fiber 32b, an optical filter 33b that extracts a wavelength $\lambda_S$ component of the signal light $E_S$ is provided. The optical filter 33b that extracts the signal light $E_S$ may include a band-stop filter that stops every wavelength component (pump light $E_{P2}$) except that of the signal light $E_S$, and a WDM optical coupler.

As can be seen from the above discussion, the waveform shaper 3 of FIG. 6 relaxes dependency to a polarization state of the supplied signal light $E_S$ by performing the optical parametric amplification by the orthogonally polarized pump lights, $E_{P1}$ and $E_{P2}$, thereby acquiring a gain saturation.

Figure 7:
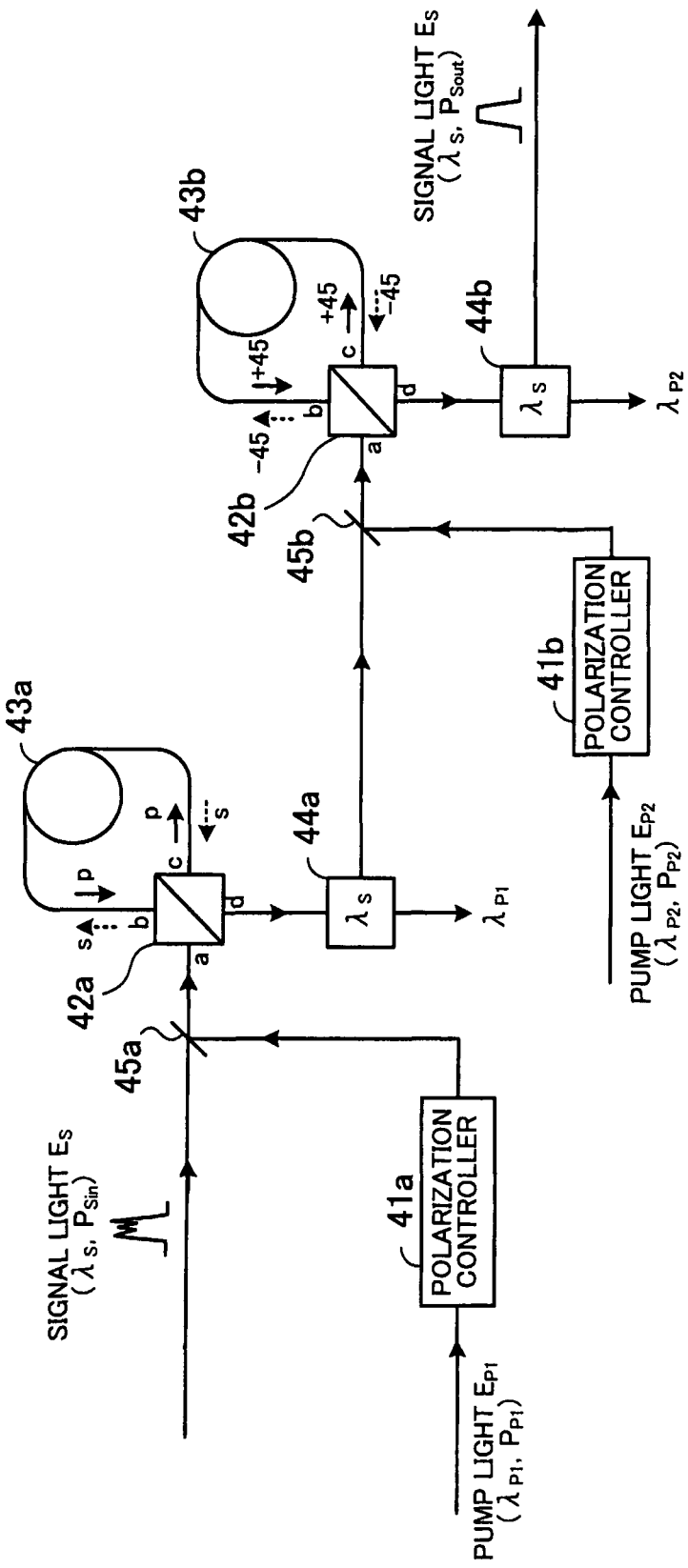
FIG. 7 illustrates a fourth waveform shaper.

FIG. 7 illustrates a fourth waveform shaper. As illustrated in FIG. 7, the waveform shaper 3 has polarization controllers 41a and 41b, polarization beam splitters 42a and 42b, optical fibers 43a and 43b, optical filters 44a and 44b, and optical couplers 45a and 45b. The waveform shaper 3 illustrated in FIG. 7 separates the signal light into two polarization components, and supplies each polarization component to separate ends of one nonlinear optical medium along with the pump light having the same polarization component. When exciting the optical fibers in two directions, the waveform shaper 3 realizes an optical parametric amplification in which polarization dependency is reduced.

As illustrated in FIG. 7, the polarization beam splitter 42a has ports "a" to "d". The polarization beam splitter 42a separates light supplied to the port "a" into linear polarization components orthogonal to each other, and guides them to the ports "b" and "c". Further, the light supplied to the port "b" and that to the port "c" are polarized and multiplexed, and guided to the port "d". The optical fiber 43a as the nonlinear optical medium is provided between the ports "b" and "c" of the polarization beam splitter 42a.

The polarization controller 41a controls a polarization state of the pump light $E_{P1}$ to be supplied to the optical fiber 43a. The polarization controller 41a controls a polarization state of the pump light $E_{P1}$ so that the pump light $E_{P1}$ may be separated into polarization components (a "p" component and an "s" component) approximately equivalent to each other by the polarization beam splitter 42a.

The signal light $E_S$ and the pump light $E_{P1}$ are multiplexed by the optical coupler 45a, and guided to the port "a" of the polarization beam splitter 42a. The polarization beam splitter 42a guides a "p" polarization component of the light supplied to the port "a" to the port "c", and an "s" polarization component thereof to the port "b". Specifically, the "p" polarization component of the signal light $E_S$ and that of the pump light $E_{P1}$ are produced from the port "c", and transferred to the port "b" through the optical fiber 43a. On the other hand, the "s" polarization component of the signal light $E_S$ and that of the pump light $E_{P1}$ are produced from the port "b", and transferred to the port "c" through the optical fiber 43a. As described above, the "p" polarization component and the "s" polarization component of the signal light $E_S$ and those of the pump light $E_{P1}$ are transferred in the direction opposite to each other through the optical fiber 43a.

Here, a pair of the pump light $E_{P1}$ ("p" polarization and "s" polarization of the pump light $E_{P1}$) is transmitted through the optical fiber 43a in the opposite direction with two orthogonal polarization states to each other. Therefore, the "p" polarization of the signal light $E_S$ is hardly affected by the "s" polarization of the pump light $E_{P1}$, and also the "s" polarization of the signal light $E_S$ is hardly affected by the "p" polarization of the pump light $E_{P1}$. Accordingly, the "p" polarization of the signal light $E_S$ is substantially subjected to the optical parametric amplification by the "p" polarization of the pump light $E_{P1}$. Similarly, the "s" polarization of the signal light $E_S$ is substantially subjected to the optical parametric amplification by the "s" polarization of the pump light $E_{P1}$. In addition, each of the pump light $E_{P1}$ and $E_{P2}$ can use a common pump light source as a light source.

The optical filter 44a extracts a wavelength $\lambda_S$ component of the signal light $E_S$ produced from the port "d" of the polarization beam splitter 42a. The optical filter 44a that extracts the signal light $E_S$ may include a band-stop filter that stops every wavelength component (pump light $E_{P1}$) except that of the signal light $E_S$, and a WDM optical coupler.

The post-stage optical circuit including the polarization controller 41b, the polarization beam splitter 42b, the optical fiber 43b, the optical filter 44b, and the optical coupler 45b operates in the same manner as in the pre-stage optical circuit including the polarization controller 41a, the polarization beam splitter 42a, the optical fiber 43a, the optical filter 44a, and the optical coupler 45a.

Note that a polarization of the pump light $E_{P2}$ used in the post-stage optical circuit is different by approximately 45 degrees from that of the pump light $E_{P1}$ used in the pre-stage optical circuit. In the polarization beam splitter 42b of the post-stage optical circuit, for example, polarization of +45 degrees and −45 degrees is obtained with respect to the p polarization obtained by the polarization beam splitter 42a of the pre-stage optical circuit.

The optical filter 44b extracts a wavelength $\lambda_S$ component of the signal light $E_S$ produced from the port "d" of the polarization beam splitter 42b. The optical filter 44b that extracts the signal light $E_S$ may include a band-stop filter that stops every wavelength component (pump light $E_{P1}$) except that of the signal light $E_S$, and a WDM optical coupler.

As can be seen from the above discussion, the optical signal processor separates the signal light $E_S$ into two polarization components, and supplies these polarization components to different ends of one optical fiber 43a, 43b along with the pump light $E_{P1}$, $E_{P2}$ having the same polarization components, respectively. When exciting the optical fibers in two directions, the optical signal processor realizes an optical parametric amplification in which polarization dependency is reduced. This permits the pre-stage optical circuit to acquire sufficient gain saturation in the polarization direction of 0 degree or 90 degrees with respect to the polarization main axis direction of the polarization beam splitter 42a. On the other hand, the post-stage optical circuit acquires relatively-low gain saturation in the polarization direction of +45 degrees and −45 degrees with respect to the polarization main axis direction of the polarization beam splitter 42b. Also, in the pre-stage optical circuit, gain saturation in the polarization direction of +45 degrees or −45 degrees is relatively low with respect to the polarization main axis direction of the polarization beam splitter 42a. However, when the subsequent-stage polarization beam splitter 42b obtains 0 degree polarization and 90 degrees polarization, the optical signal processor can acquire sufficient gain saturation.

When further preparing pump light of other polarization states, the waveform shaper 3 can acquire more sufficient gain saturation to every signal light. Further, the post-stage optical circuit illustrated in FIG. 7 may be omitted. In other words, the waveform shaper 3 may have only the pre-stage optical circuit. Fundamentally, each optical circuit has a configuration in which polarization dependency is absent to a linear optical parametric amplification; however, some degree of polarization dependency is caused in the optical parametric amplification under conditions of gain saturation. However, the waveform shaper 3 can shape waveforms by using only the pre-stage optical circuit under use conditions that some degree of polarization dependency does not pose a problem.

Figure 8:
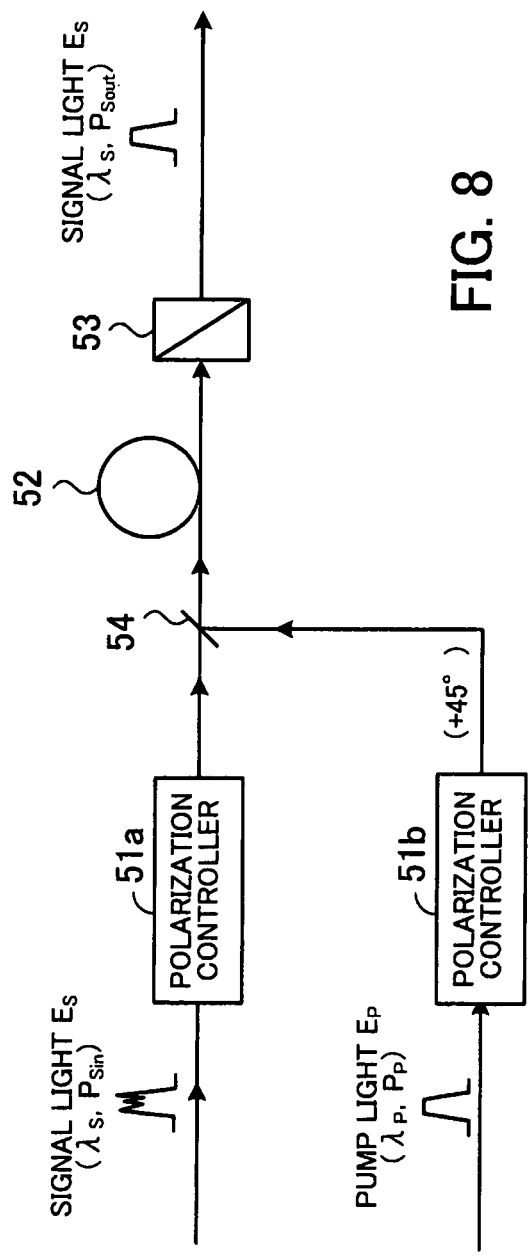
FIG. 8 illustrates a fifth waveform shaper.

FIG. 8 illustrates a fifth waveform shaper. As illustrated in FIG. 8, the waveform shaper 3 has polarization controllers 51a and 51b, an optical fiber 52, a polarizer 53, and an optical coupler 54.

On the output side of the optical fiber 52, the polarizer 53 is disposed. The polarizer 53 transmits a linear polarization component in the polarization main axis direction (vertical axis direction of FIG. 8).

The polarization controller 51a controls a polarization state of the signal light $E_S$ so as to be orthogonal to a polarization main axis of the polarizer 53. Further, the polarization controller 51a sets the polarization state so that the polarizer 53 can stop an output.

The polarization controller 51b controls a polarization state of the pump light $E_P$ so as to change only a predetermined state from the polarization state of the signal light $E_S$. For example, the polarization controller 51b controls the polarization state of the pump light $E_P$ so as to have a linear polarization inclined by approximately 45 degrees with respect to the polarization main axis of the polarizer 53.

The signal light $E_S$ produced from the polarization controller 51a and the pump light $E_P$ produced from the polarization controller 51b are multiplexed by the optical coupler 54, and supplied to the optical fiber 52.

As described above, the polarization state of the signal light $E_S$ is set so that an output may be stopped by the polarizer 53. However, as the power $P_P$ of the pump light $E_P$ is more increased, the polarization state of the signal light $E_S$ is more changed by the optical fiber 52 as the nonlinear optical medium. This permits the polarizer 53 to transmit a part of the signal light $E_S$.

Due to the optical parametric amplification effect, light transmitted through the polarizer 53 exponentially increases (e.g., proportional to a square of the power $P_P$ of the pump light $E_P$) along with further increase in the power $P_P$ of the pump light $E_P$. As a result, the output of the polarizer 53 is operated as an optical switch. The four-wave mixing is selectively caused with respect to the signal light $E_S$ having the same polarization component as that of the pump light $E_P$. Therefore, when the power $P_P$ of the pump light $E_P$ increases to some extent, the polarization state of the signal light $E_S$ produced from the optical fiber 52 is approximated to that of the pump light $E_P$.

The waveform shaper 3 illustrated in FIG. 8 adjusts at least one power of the power $P_{Sin}$ of the signal light $E_S$ and the power $P_P$ of the pump light $E_P$ so as to saturate a gain of the optical parametric amplification of the signal light $E_S$ in the optical fiber 52. On the input side of the polarization controllers 51a and 51b, for example, a power adjuster is provided, and power adjustment is performed. As a result, the waveform shaper 3 of FIG. 8 can operate as the optical limiter amplifier that more reduces a gain as the power $P_{Sin}$ of the signal light $E_S$ more increases, and shape the signal light $E_S$.

Figure 9:
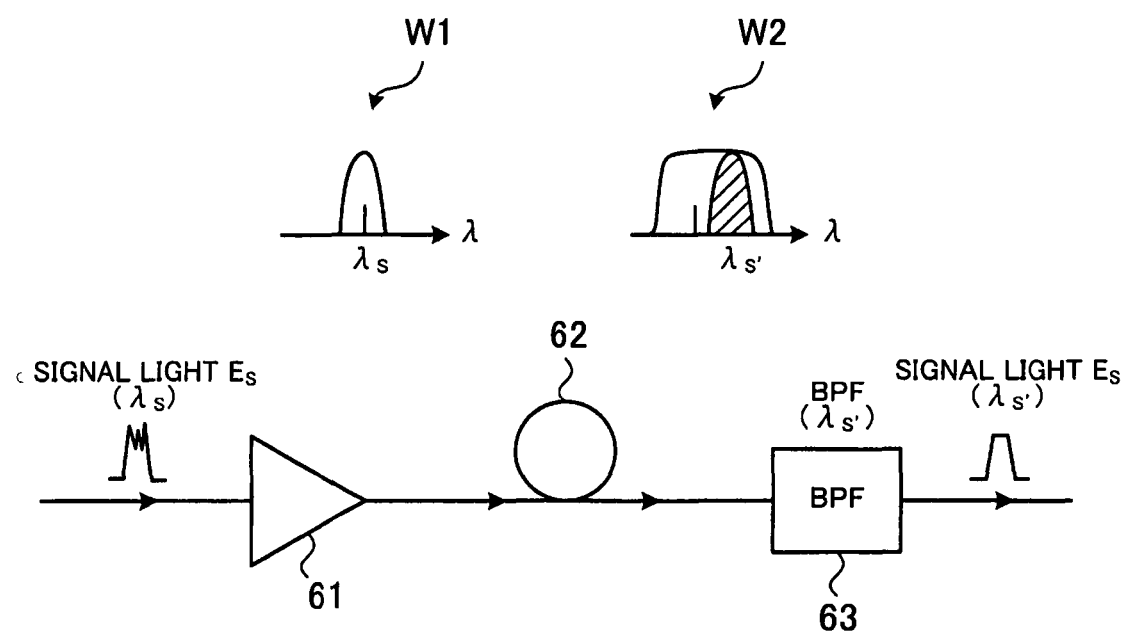
FIG. 9 illustrates a sixth waveform shaper.

FIG. 9 illustrates a sixth waveform shaper. As illustrated in FIG. 9, the waveform shaper 3 has an optical amplifier 61, an optical fiber 62, and a band pass filter (BPF) 63. FIG. 9 illustrates a waveform W1 of a spectrum of the signal light $E_S$ supplied to the optical fiber 62 and a waveform W2 of a spectrum of the signal light $E_S$ produced from the optical fiber 62.

The signal light $E_S$ is amplified by the optical amplifier 61, and supplied to the optical fiber 62 as the nonlinear optical medium. The optical amplifier 61 controls power of the signal light $E_S$ so as to acquire a frequency chirp by the optical fiber 62. As illustrated in the waveforms W1 and W2, a spectrum of the signal light $E_S$ is expanded by a frequency chirp generated due to light intensity of its own by the optical fiber 62.

Among spectra expanded by the frequency chirp, the BPF 63 transmits light in a predetermined band. Specifically, the BPF 63 extracts a component (wavelength: $\lambda_{S'}$) detuned from the wavelength $\lambda_S$ in the signal light $E_S$ produced from the optical fiber 62. This permits the waveform shaper 3 to acquire the signal light $E_S$ in which intensity noise is suppressed.

In addition, in the waveform shaper 3 of FIG. 9, an optical demodulator may be provided on the input side of the optical fiber 62. The optical demodulator may demodulate signal light of phase modulated light to intensity modulated light, and supply it to the optical fiber 62.

Figure 10:
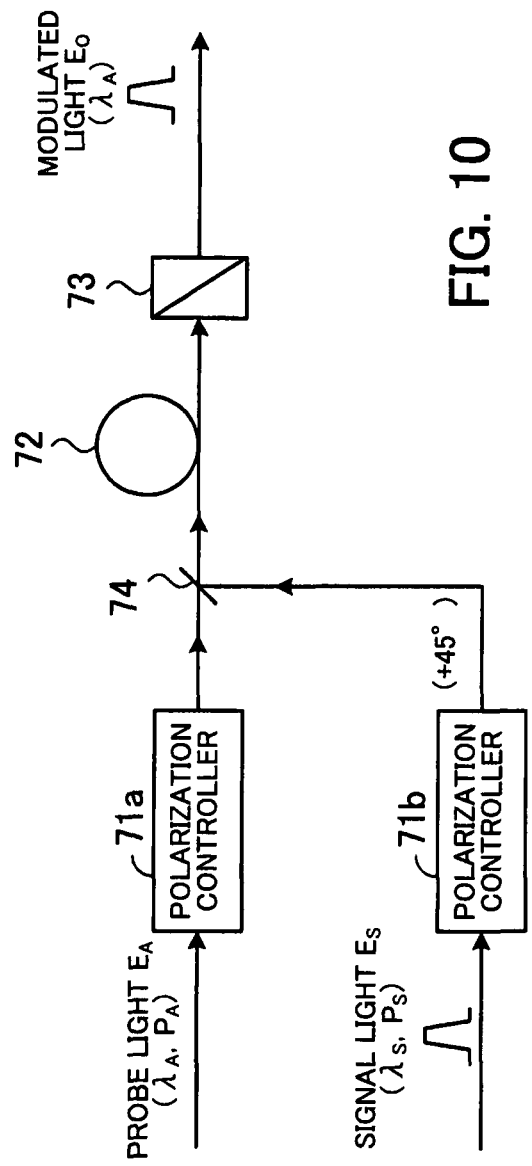
FIG. 10 illustrates a first light modulator.

Next, the light modulator 2 will be described. FIG. 10 illustrates a first light modulator. As illustrated in FIG. 10, the light modulator 2 has polarization controllers 71a and 71b, an optical fiber 72, a polarizer 73, and an optical coupler 74.

To the polarization controller 71a, probe light $E_A$ having a wavelength $\lambda_A$ and power $P_A$ different from those of the signal light $E_S$ is supplied. To the polarization controller 71b, the signal light $E_S$ having a wavelength $\lambda_S$ and power $P_S$ shaped by the waveform shaper 3 is supplied.

The signal light $E_S$ and the probe light $E_A$ are multiplexed by the optical coupler 74, and supplied to the optical fiber 72 as the nonlinear optical medium. On the output side of the optical fiber 72, the polarizer 73 is disposed. The polarizer 73 transmits a linear polarization component in the polarization main axis direction (vertical axis direction of FIG. 10).

The polarization controller 71a controls the polarization state of the probe light $E_A$ so as to be orthogonal to a polarization main axis of the polarizer 73. Further, the polarization controller 71a sets the polarization state of the probe light $E_A$ so that an output may be stopped by the polarizer 73.

The polarization controller 71b controls the polarization state of the signal light $E_S$ so as to be changed by a predetermined state from the polarization state of the probe light $E_A$. For example, the polarization controller 71b controls the polarization state of the signal light $E_S$ so as to be a linear polarization state inclined by approximately 45 degrees with respect to the polarization main axis of the polarizer 73 (the polarization state of the probe light $E_A$ is orthogonal to the polarization main axis of the polarizer 53).

As described above, the polarization state of the probe light $E_A$ is set so that an output may be stopped by the polarizer 73. However, as the power $P_S$ of the signal light $E_S$ more increases, the polarization state of the probe light $E_A$ is more changed by the optical fiber 72 as the nonlinear optical medium. This permits a part of the probe light $E_A$ to transmit the polarizer 73.

Due to the optical parametric amplification effect, light transmitted through the polarizer 73 exponentially increases (e.g., proportional to a square of the power $P_S$ of the signal light $E_S$) along with further increase in the power $P_S$ of the signal light $E_S$. As a result, the output of the polarizer 73 is operated as an optical switch. The four-wave mixing is selectively caused with respect to the probe light $E_A$ having the same polarization component as that of the signal light $E_S$. Therefore, when the power $P_S$ of the signal light $E_S$ increases to some extent, the polarization state of the probe light $L_A$ produced from the optical fiber 72 is approximated to that of the signal light $E_S$.

The light modulator 2 of FIG. 10 performs ON-OFF modulation of light without a wavelength conversion of the probe light $E_A$. Further, the polarizer 73 stops an off level up to a sufficiently low value, and outputs an on level with a gain by the optical parametric amplification. This permits the light modulator 2 to perform optical intensity modulation having a high extinction ratio and a high S/N ratio. In the case of the above-described arrangement of 45 degrees, for example, loss of approximately 3 dB is caused during the transmission of the polarizer 73. However, the light modulator 2 can perform the optical intensity modulation having a net gain based on the gain of the optical parametric amplification.

Figure 11:
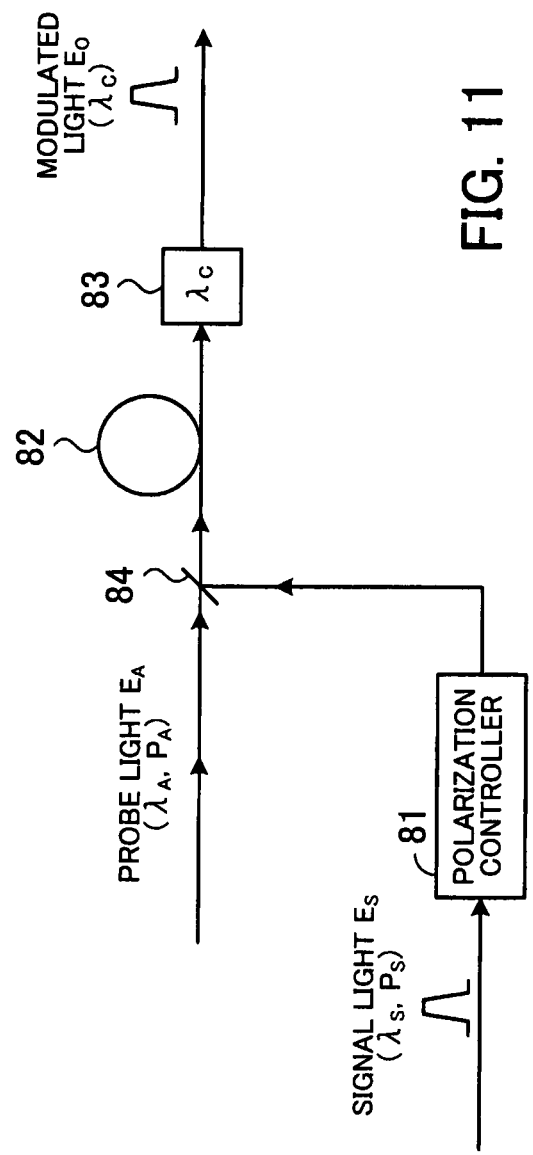
FIG. 11 illustrates a second light modulator.

FIG. 11 illustrates a second light modulator. As illustrated in FIG. 11, the light modulator 2 has a polarization controller 81, an optical fiber 82, an optical filter 83, and an optical coupler 84. The light modulator 2 of FIG. 10 intensity-modulates the probe light $E_A$ having a wavelength $\lambda_A$, and outputs modulated light $E_O$ having a wavelength $\lambda_A$. The light modulator 2 of FIG. 11 outputs, as the intensity modulated light, idler light (wavelength $\lambda_C$) of probe light generated by the four-wave mixing in which the signal light is used as the pump light.

The polarization controller 81 controls the polarization state of the signal light $E_S$ so as to be matched with that of the probe light $E_A$. The signal light $E_S$ and the probe light $E_A$ are multiplexed by the optical coupler 84, and supplied to the optical fiber 82.

As illustrated in FIG. 4, in the optical fiber 82, idler light having a wavelength $\lambda_C$ corresponding to the probe light $E_A$ is generated by the four-wave mixing in the interaction between the probe light $E_A$ and the signal light $E_S$. When extracting the signal light having a wavelength $\lambda_C$, the optical filter 83 acquires the modulated light $E_O$ having a wavelength $\lambda_C$.

Each wavelength of the waveform-shaped signal light $E_S$, probe light $E_A$, and idler light satisfies the formula (1). The generation efficiency of the idler light is proportional to a square of the power $P_S$ of the waveform-shaped signal light $E_S$ as the pump light. Therefore, when preparing the signal light $E_S$ with a high power level, the light modulator 2 can perform optical intensity modulation with high efficiency.

As can be seen from the above sequence, the light modulator 2 can acquire the modulated light $E_O$ that is intensity-modulated to a wavelength $\lambda_C$ different from a wavelength $\lambda_A$ of the probe light $E_A$. In addition to the above, as the optical intensity modulator, a Mach-Zehnder interferometer optical fiber switch and a nonlinear optical loop mirror switch can be used.

Figure 12:
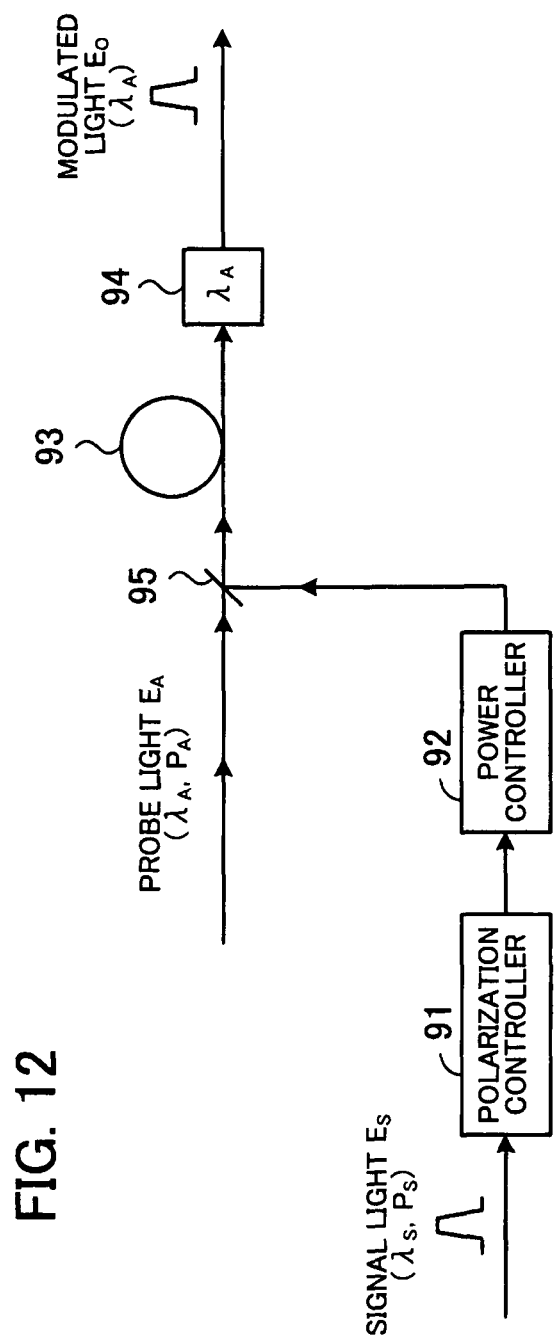
FIG. 12 illustrates a third light modulator.

FIG. 12 illustrates a third, light modulator. As illustrated in FIG. 12, the light modulator 2 has a polarization controller 91, a power controller 92, an optical fiber 93, an optical filter 94, and an optical coupler 95. The light modulator 2 of FIG. 12 subjects signal light to optical phase modulation by using cross phase modulation in the optical fiber 93.

To the polarization controller 91, the waveform-shaped signal light $E_S$ having a wavelength $\lambda_S$ and power $P_S$ is supplied. The polarization controller 91 controls the polarization state of the waveform-shaped signal light $E_S$ so as to be matched with the polarization state of the probe light $E_A$ having a wavelength $\lambda_A$ and power $P_A$. The power controller 92 performs power control of the polarization-controlled signal light $E_S$. The power-controlled signal light $E_S$ is multiplexed with the probe light $E_A$ by the optical coupler 95, and supplied to the optical fiber 93.

By using the power $P_S$ of the signal light $E_S$, the optical phase modulation is provided to the probe light $E_A$ by the cross phase modulation. An intensity of the cross phase modulation is proportional to a peak intensity of the signal light $E_S$. The power controller 92 controls a peak power of the signal light $E_S$ so that a phase shift due to the cross phase modulation in the peak power of the signal light $E_S$ is equal to $\pi$.

Specifically, in the probe light $E_A$, when the power $P_S$ of the signal light $E_S$ is a peak, a phase is $\pi$-shifted. On the other hand, when the power $P_S$ of the signal light $E_S$ is zero, a phase is not shifted. This permits the light modulator 2 of FIG. 12 to give the optical phase modulation of binary values $(0, \pi)$ to the probe light $E_A$.

As can be seen from the above sequence, the optical signal processor modulates the probe light $E_A$ having a wavelength $\lambda_A$ based on an intensity change of the signal light $E_S$ having a wavelength $\lambda_S$.

Further, since the signal light $E_S$ is waveform-shaped and optically modulated by the waveform shaper 3, the optical signal processor can suppress the modulated light $E_O$ from including noise and waveform distortion.

A third embodiment will be described in detail below with reference to the accompanying drawings. According to the third embodiment, the signal light is a phase-modulated signal light, and this signal light is moved to a light wave having another wavelength.

Figure 13:
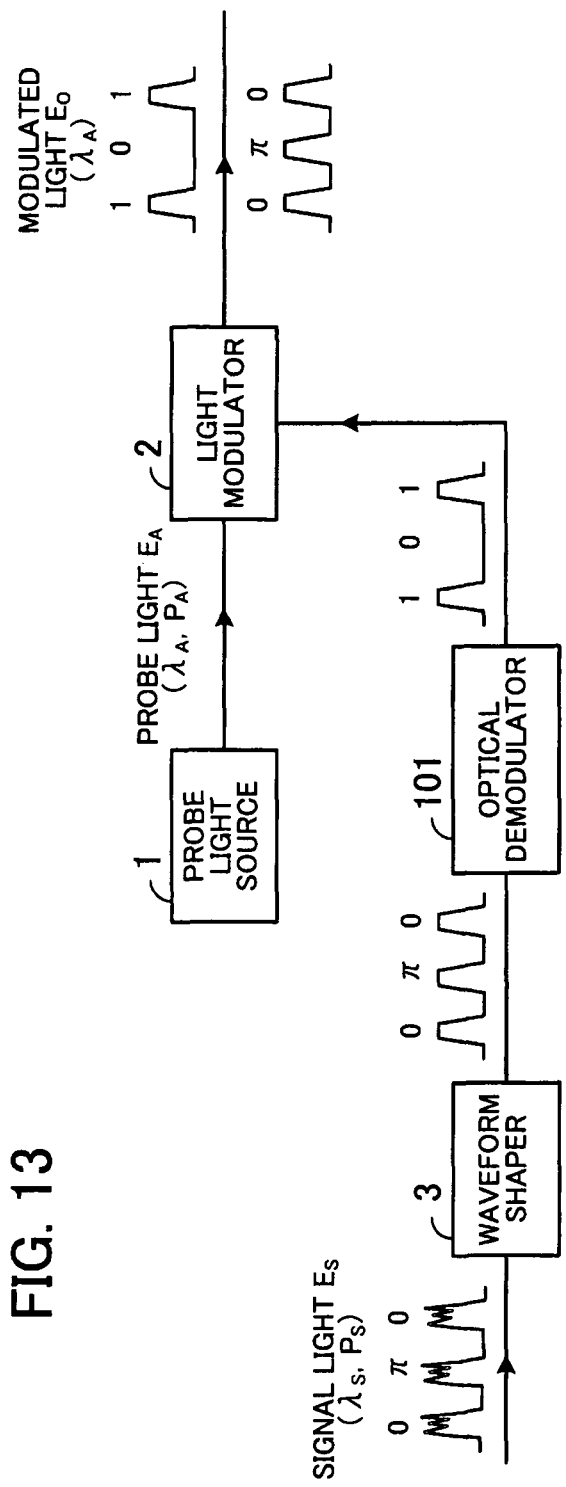
FIG. 13 illustrates the optical signal processor according to a third embodiment.

FIG. 13 illustrates the optical signal processor according to the third embodiment. The optical signal processor of FIG. 13 includes an optical demodulator 101 in addition to the optical signal processor of FIG. 2. In FIG. 13, the same circuit elements as those in FIG. 2 are indicated by the same reference numerals as in FIG. 2, and the description will not be repeated here.

To the waveform shaper 3, the phase-modulated signal light $E_S$ (optical phase modulated signal light) is supplied. The optical demodulator 101 converts the signal light $E_S$ waveform-shaped by the waveform shaper 3 into intensity modulated light. Examples of the optical demodulator 101 include a one-bit delay interferometer instrument. The light modulator 2 modulates the probe light $E_A$ produced from the probe light source 1 based on the intensity change of the signal light $E_S$ converted into the intensity modulated light, and outputs the modulated light $E_O$ having a wavelength $\lambda_A$ based on data of the signal light $E_S$.

For example, when applying the light modulator 2 of FIG. 12 to that of FIG. 13, the probe light $E_A$ is modulated to the phase modulated light and output.

As described above, the optical signal processor can convert the phase modulated signal light $E_S$ to the modulated light $E_O$ having a wavelength $\lambda_A$.

A fourth embodiment will be described in detail below with reference to the accompanying drawings. According to the fourth embodiment, a case where WDM light is used as the probe light will be described.

Figure 14:
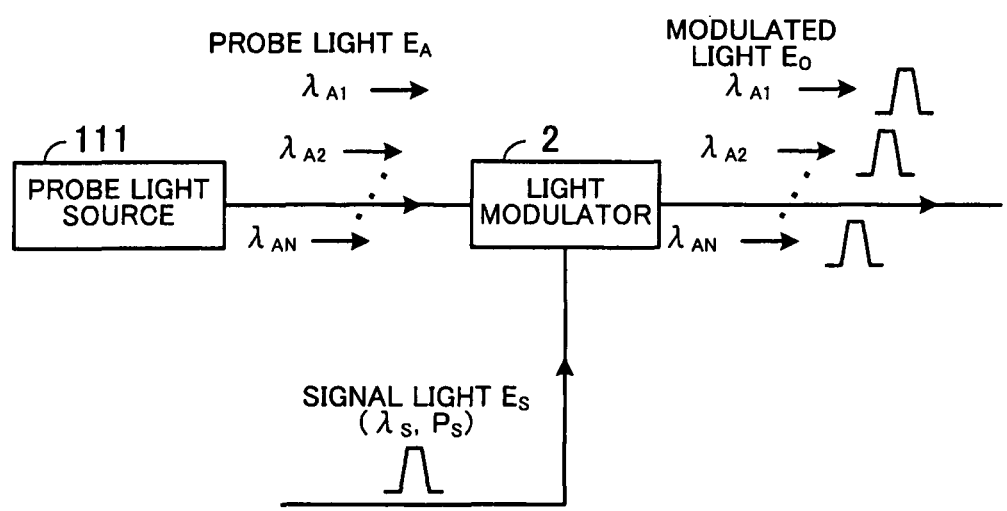
FIG. 14 illustrates the optical signal processor according to a fourth embodiment.

FIG. 14 illustrates the optical signal processor according to the fourth embodiment. As illustrated in FIG. 14, the optical signal processor includes the light modulator 2 and a probe light source 111. The light modulator 2 of FIG. 14 is configured in the same manner as in that of FIG. 1, and the description will not be repeated here.

The probe light source 111 supplies to the light modulator 2 the probe light $E_A$ (WDM light having N channels) having wavelengths $\lambda_{A1}, \lambda_{A2}, \ldots, \lambda_{AN}$ different from the wavelength $\lambda_S$ of the signal light $E_S$. The light modulator 2 modulates the probe light $E_A$ having wavelengths $\lambda_{A1}, \lambda_{A2}, \ldots, \lambda_{AN}$ produced from the probe light source 111 based on the intensity change of the signal light $E_S$, and outputs the modulated light $E_O$ having wavelengths $\lambda_{A1}, \lambda_{A2}, \ldots, \lambda_{AN}$ based on the data of the signal light $E_S$. In short, each channel of the WDM light produced from the probe light source 111 is modulated by the same data.

As described above, when supplying the WDM light having N channels from the probe light source 111 to the light modulator 2, the optical signal processor can subject the WDM light having N channels to optical intensity modulation by using the same data of the signal light $E_S$ without the opto-electronic conversion.

Note that the waveform shaper 3 can also waveform-shape the signal light $E_S$ and supply it to the light modulator 2.

A fifth embodiment will be described in detail below with reference to the accompanying drawings. According to the fifth embodiment, the optical signal processor modulates signal light transmitted from a certain optical network so as to be inserted into WDM light transmitted through another optical network, and inserts the modulated signal light into the WDM light.

Figure 15:
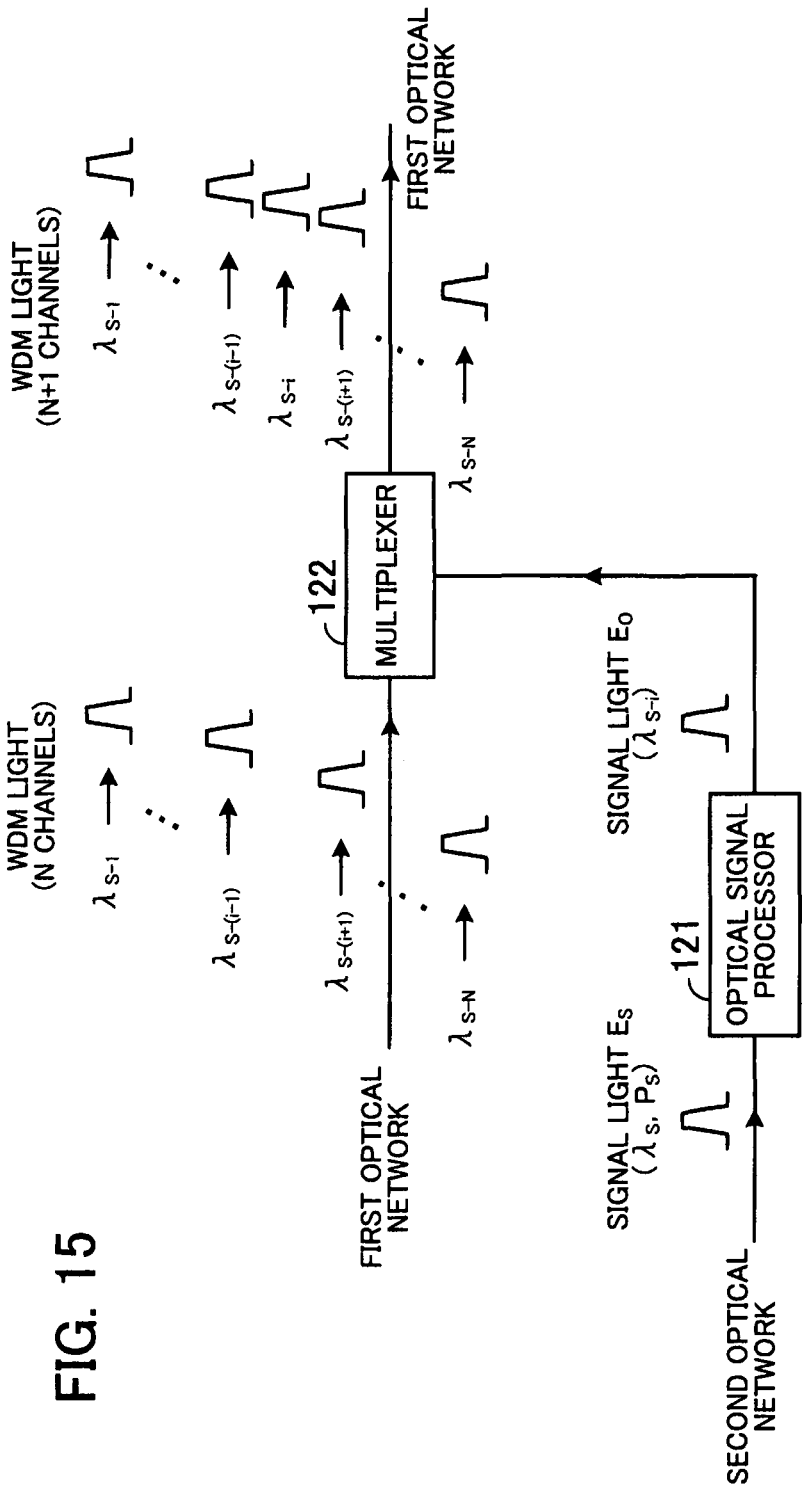
FIG. 15 illustrates an optical transmission system according to a fifth embodiment.

FIG. 15 illustrates an optical transmission system according to the fifth embodiment. FIG. 15 illustrates an optical signal processor 121 and a multiplexer 122.

In a first optical network into which the multiplexer 122 is inserted, the WDM light having N channels is transmitted. In the WDM light having N channels, signal light having a wavelength $\lambda_{S-i}$ is free (not used).

The optical signal processor 121 is, for example, the optical signal processor illustrated in FIG. 1 or 2. The optical signal processor 121 receives the signal light $E_S$ having a wavelength $\lambda_S$ from a second optical network, and modulates it into the signal light (modulated light) $E_O$ having the wavelength $\lambda_{S-i}$. Specifically, the optical signal processor 121 modulates the wavelength $\lambda_S$ of the signal light $E_S$ received from the second optical network into the free wavelength $\lambda_{S-i}$ of the WDM light from the first optical network.

The multiplexer 122 multiplexes the signal light $E_S$ having the wavelength $\lambda_{S-i}$ produced from the optical signal processor 121 with the WDM light. This process permits the multiplexer 122 to output the WDM light having N+1 channels.

As described above, the optical signal processor 121 converts the signal light $E_S$ having the wavelength $\lambda_S$ transmitted through the second optical network into the free wavelength $\lambda_{S-i}$ of the WDM light transmitted through the first optical network. This process permits the optical signal processor 121 to insert the signal light transmitted through the first optical network into the WDM light transmitted through the second optical network without the opto-electronic conversion.

Note that the waveform shaper 3 may waveform-shape the signal light $E_S$ and supply it to the light modulator 2.

A sixth embodiment will be described in detail below with reference to the accompanying drawings. According to the sixth embodiment, the optical signal processor subjects each wavelength light of the WDM light to optical intensity modulation based on the same data, and then demultiplexes it by a demultiplexer.

Figure 16:
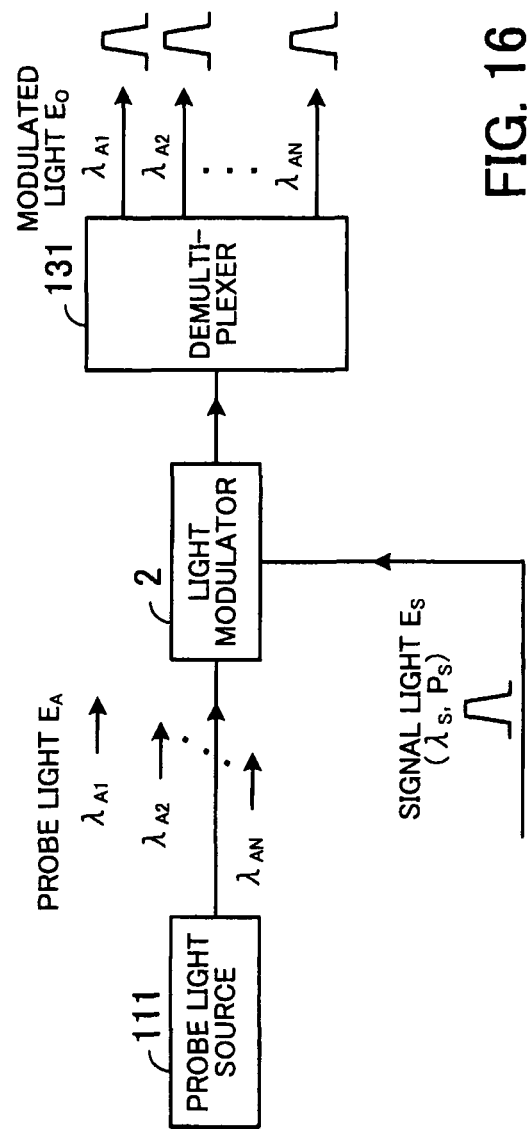
FIG. 16 illustrates the optical transmission system according to a sixth embodiment.

FIG. 16 illustrates the optical transmission system according to the sixth embodiment. FIG. 16 illustrates the light modulator 2, the probe light source 111, and a demultiplexer 131. The light modulator 2 and probe light source 111 of FIG. 16 are configured in the same manner as in those of FIG. 14, and the description will not be repeated here.

The optical transmission system of FIG. 16 demultiplexes the WDM light modulated by the light modulator 2 by using the demultiplexer 131. The demultiplexer 131 demultiplexes it into the modulated light $E_O$ having wavelengths $\lambda_{A1}$, $\lambda_{A2}, \ldots, \lambda_{AN}$.

As can be seen the above discussion, when demultiplexing the WDM light resulting from modulating each wavelength channel by the same data, the optical transmission system can distribute data without the opto-electronic conversion to an optical network including separate wavelength bands.

A seventh embodiment will be described in detail below with reference to the accompanying drawings. According to the seventh embodiment, the optical transmission system inserts the signal light demultiplexed according to the sixth embodiment into WDM light of two or more optical networks.

Figure 17:
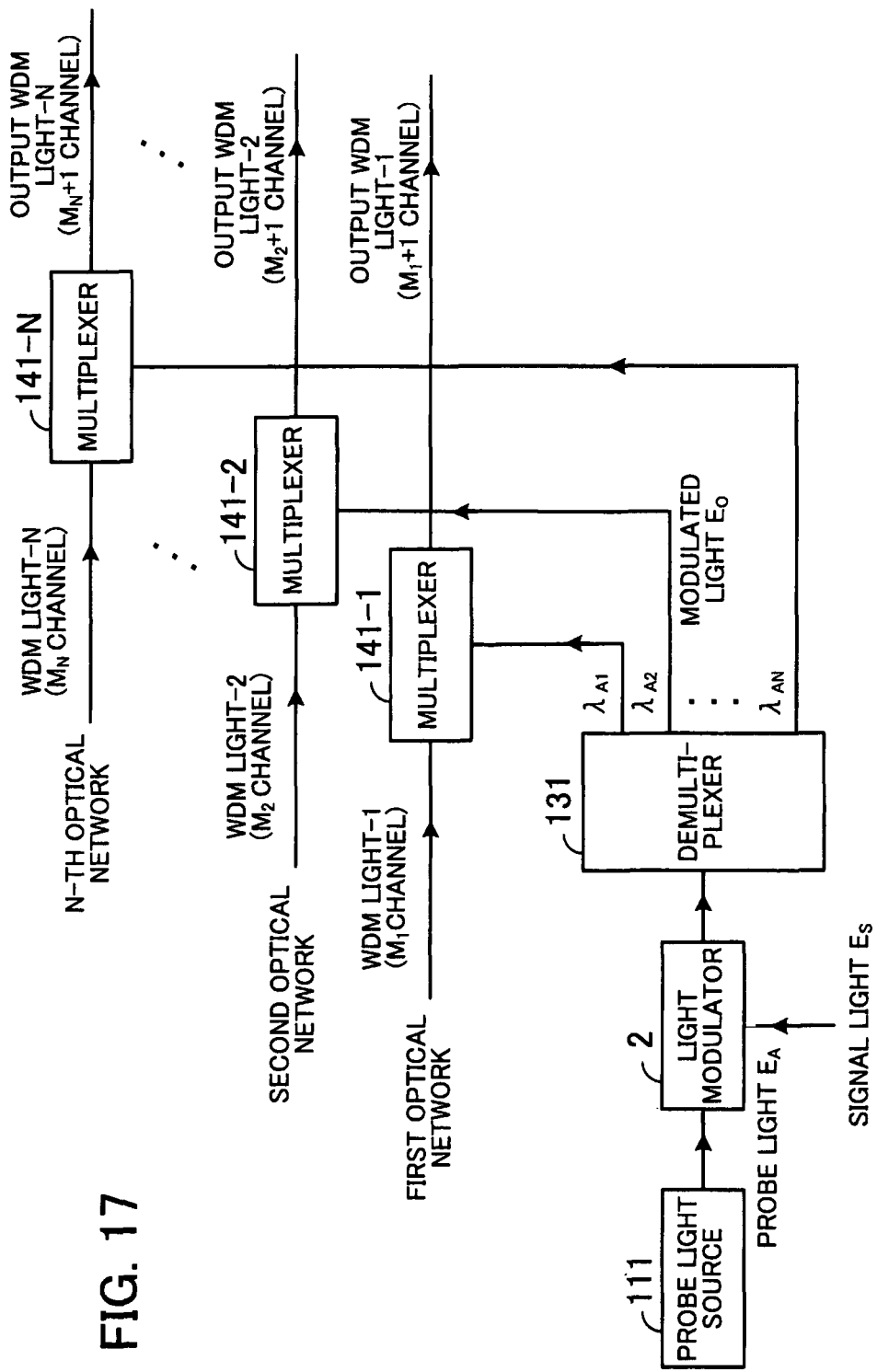
FIG. 17 illustrates the optical transmission system according to a seventh embodiment.

FIG. 17 illustrates the optical transmission system according to the seventh embodiment. FIG. 17 illustrates N number of multiplexers 141-1 to 141-N. The light modulator 2, probe light source 111, and demultiplexer 131 of FIG. 17 are configured in the same manner as in those of FIG. 16, and the description will not be repeated here.

In a first optical network into which the multiplexer 141-1 is inserted, WDM light with $M_1$ channels is transmitted. In a second optical network into which the multiplexer 141-2 is inserted, WDM light with $M_2$ channels is transmitted. In the same manner as above, In an N-th optical network into which the multiplexer 141-N is inserted, WDM light with $M_N$ channels is transmitted.

From the demultiplexer 131, modulated light $E_O$ having N number of wavelengths $\lambda_{A1}, \lambda_{A2}, \ldots, \lambda_{AN}$ is produced. Each of the wavelengths $\lambda_{A1}, \lambda_{A2}, \ldots, \lambda_{AN}$ is assumed to be free in the first, second, . . . N-th optical networks.

The multiplexer 141-1 multiplexes the modulated light $E_O$ having the wavelength $\lambda_{A1}$ with the WDM light-1. As a result, the WDM light transmitted through the first optical network has $M_1+1$ channels. The multiplexer 141-2 multiplexes the modulated light $E_O$ having the wavelength $\lambda_{A2}$ with the WDM light-2. As a result, the WDM light transmitted through the second optical network has $M_2+1$ channels. In the same manner as above, the multiplexer 141-N multiplexes the modulated light $E_O$ having the wavelength $\lambda_{AN}$ with the WDM light-N. As a result, the WDM light transmitted through the N-th optical network has $M_N+1$ channels.

As can be seen from the above discussion, when inserting the demultiplexed signal light into the WDM light transmitted through two or more optical networks by using multiplexers, the optical transmission system can insert the signal light into two or more optical networks transmitting the WDM light without the opto-electronic conversion.

An eighth embodiment will be described in detail below with reference to the accompanying drawings. According to the eighth embodiment, WDM light is supplied to the optical signal processor as signal light.

Figure 18:
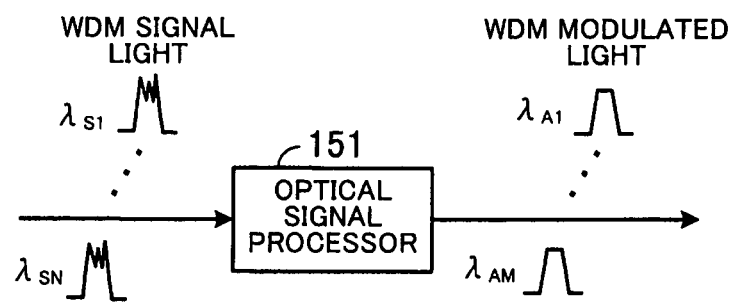
FIG. 18 illustrates the optical signal processor according to an eighth embodiment.

FIG. 18 illustrates the optical signal processor according to the eighth embodiment. FIG. 18 illustrates the optical signal processor 151. The optical signal processor 151 is the optical signal processor illustrated in FIG. 14. In the optical signal processor 151 of FIG. 18, WDM signal light having N channels as the signal light is supplied to the optical signal processor of FIG. 14 and WDM modulated light having M channels is produced therefrom.

Conventionally, the opto-electronic conversion is applied to each optical signal separated from the WDM light in each channel (namely, in each wavelength), and then waveform shaping and light modulation are performed. As compared with the above, in the optical signal processor 151, intensity noise of the WDM light is directly suppressed without the opto-electronic conversion, and optical modulation signal light using each channel is output.

As described above, the optical signal processor 151 can realize light modulation based on data of each optical signal without subjecting the WDM light to the opto-electronic conversion.

In addition, the WDM signal light may be waveform-shaped by the waveform shaper, and supplied to the light modulator. In this case, an optical band-pass filter having a passband may be provided near the center of each wavelength of the WDM signal light for the output from the waveform shaper. In this case, for example, a combination of an interleaver filter and a fiber grating is effective. Further, a method for using a band-stop optical filter that stops every wavelength component except a wavelength component of the WDM signal light is also effective for the output of the waveform shaper.

Figure 19:
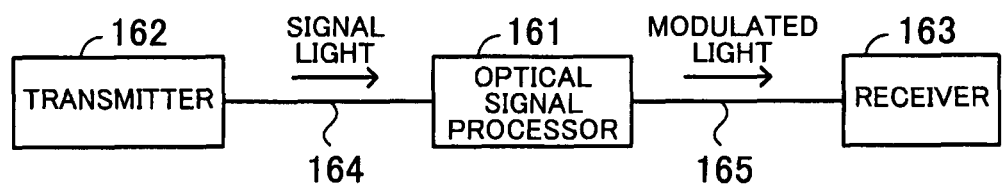
FIG. 19 illustrates the optical transmission system according to a ninth embodiment.

A ninth embodiment will be described in detail below with reference to the accompanying drawings. FIG. 19 illustrates the optical transmission system according to the ninth embodiment. FIG. 19 illustrates an optical signal processor 161, a transmitter 162, and a receiver 163. The optical signal processor 161 is the optical signal processor illustrated in FIG. 1 or 2. The optical signal processor 161 and the transmitter 162 are connected through an optical transmission line 164, and the optical signal processor 161 and the receiver 163 are connected through an optical transmission line 165.

The optical signal processor 161 is provided, for example, within an optical repeater. The optical signal processor 161 optically modulates probe light by an optical signal received from the optical transmission line 164, and supplied it to the optical transmission line 165. The optical signal processor 161 may waveform-shape an optical signal received from the optical transmission line 164 and optically modulate the probe light.

This process permits the optical signal processor 161 to exchange an optical signal between the transmitter 162 and the receiver 163 without the opto-electronic conversion. Further, this process permits the optical signal processor 161 to suppress degradation of the optical S/N ratio during the insertion of optical signals, and suppress power consumption of optical network nodes.

In addition, the optical transmission lines 164 and 165 may transmit the signal light while amplifying power by using an optical amplifier. Further, the optical transmission lines 164 and 165 may be optimally designed so as to compensate chromatic dispersion of transmission line fibers.

Figure 20:
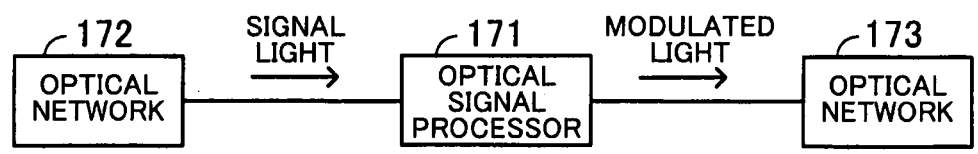
FIG. 20 illustrates the optical transmission system according to a tenth embodiment.

A tenth embodiment will be described in detail below with reference to the accompanying drawings. FIG. 20 illustrates the optical transmission system according to the tenth embodiment. FIG. 20 illustrates an optical signal processor 171 and optical networks 172 and 173. The optical signal processor 171 is the optical signal processor illustrated in FIG. 1 or 2. The optical signal processor 171 is connected between the optical networks 172 and 173. The optical signal processor 171 optically modulates probe light having a free wavelength of the optical network 173 by signal light of the optical network 172, and supplies it to the optical network 173. The optical signal processor 171 may waveform-shape the signal light of the optical network 172, and optically modulate the probe light.

This process permits the optical signal processor 171 to exchange an optical signal between two optical networks without the opto-electronic conversion. Further, this process permits the optical signal processor 171 to suppress degradation of the optical S/N ratio during the insertion of optical signals, and suppress power consumption of optical network nodes.

Figure 21:
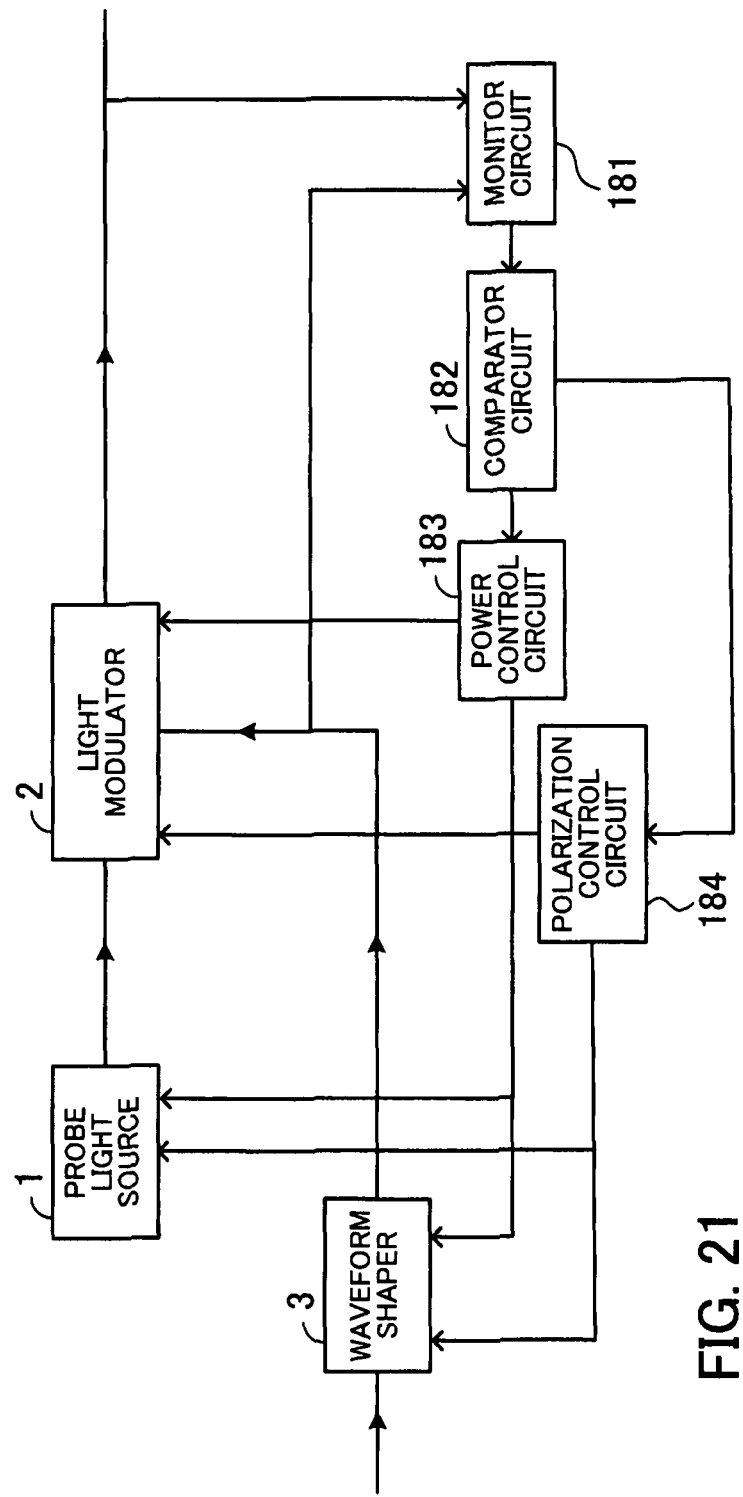
FIG. 21 illustrates the optical signal processor according to an eleventh embodiment.

An eleventh embodiment will be described in detail below with reference to the accompanying drawings. FIG. 21 illustrates the optical signal processor according to the eleventh embodiment. As illustrated in FIG. 21, the optical signal processor includes a monitor circuit 181, a comparator circuit 182, a power control circuit 183, and a polarization control circuit 184. The probe light source 1, the light modulator 2, and the waveform shaper 3 are configured in the same manner as in those illustrated in FIG. 2, and the description will not be repeated here.

The monitor circuit 181 monitors quality of signal light produced from the waveform shaper 3 and that of modulated light produced from the light modulator 2. Examples of the quality include an optical power, an optical S/N ratio, a Q-factor and a bit error rate. In addition, the monitor circuit 181 has, for example, a filter to extract a wavelength of the signal light and a light-sensitive element to receive the signal light extracted by the filter.

The comparator circuit 182 compares a predetermined threshold and quality of the waveform-shaped signal light and that of the modulated light monitored by the monitor circuit 181. Examples of the predetermined threshold include an optical power, an optical S/N ratio, a Q-factor and bit error rate as a target of the signal light and the modulated light.

The power control circuit 183 controls a power controller of the light modulator 2 and that of the waveform shaper 3 based on comparison results of the comparator circuit 182. The power control circuit 183 controls light power of light waves related to light modulation of the light modulator 2 and that of light waves related to the waveform-shaping of the waveform shaper 3.

The polarization control circuit 184 controls a polarization controller of the light modulator 2 and that of the waveform shaper 3 based on comparison results of the comparator circuit 182. Further, the polarization control circuit 184 controls a polarization state of light waves related to the light modulation of the light modulator 2 and that of light waves related to the waveform shaping of the waveform shaper 3.

As described above, when performing feedback control, the optical signal processor can acquire desired modulated light from the light modulator 2.

In addition, in the above-described embodiments, the optical signal processor may use a WDM optical coupler as a multiplexer used for multiplexing signal light and pump light and an optical filter used for extracting signal light at an output stage.

As an optical fiber used as a nonlinear optical medium, a nonlinear optical fiber having a high nonlinear optical effect is effectively used. A length of the optical fiber is determined so as to acquire a desired optical parametric amplification efficiency, optical limiter effect, and frequency chirp. Further, a zero dispersion wavelength ($\lambda_0$) of the optical fiber may be set in an optimum detuned position with respect to the signal light and the pump light.

As the optical fiber, for example, a highly nonlinear optical fiber (HNLF) having a high nonlinear optical effect is effectively used. Further, as the optical fiber, an optical fiber or optical waveguide in which germanium or bismuth is doped into a core to enhance a nonlinear refractive index, an optical fiber or optical waveguide in which a mode field is reduced to enhance an optical power density, an optical fiber or optical waveguide in which chalcogenide glass is used, and an optical fiber or optical waveguide in which a photonic crystal fiber structure is used may be adopted.

As other nonlinear optical mediums, a semiconductor optical amplifier having a quantum well structure, a quantum dot semiconductor optical amplifier, and a silicon photonics waveguide can be used. Further, as other nonlinear optical mediums, a device that causes a second-order nonlinear optical effect such as the three-wave mixing can also be used. In this case, examples of the above-described device include a $LiNbO_3$ waveguide and GaAlAs element having a pseudo-phase matching structure, and second-order nonlinear optical crystal. Also when using the second-order nonlinear optical medium, a wavelength arrangement in which phase matching is taken is preferably adopted.

Pump light of the optical parametric amplification may be CW light or a light pulse. When the pump light is CW light, since timing control to an optical signal to be transmitted by the signal light does not need to be performed, the optical signal processor is realized by a simple structure. However, generation efficiency of the nonlinear optical effect depends on peak power of the pump light. Therefore, the sufficiently-amplified pump light may be supplied to an optical fiber to secure a sufficient gain. Further, when stimulated Brillouin scattering (SBS) occurs, the supplied pump light is reflected and generation of the optical parametric amplification is limited. The stimulated Brillouin scattering can be suppressed by using a method for giving a temperature distribution in the longitudinal direction of an optical fiber, or a method for expanding spectra of the pump light. For example, the expansion of spectra of the pump light is realized by performing phase modulation or frequency modulation with low frequency.

On the other hand, when the pump light is a light pulse, since peak power can be easily enlarged, a high gain is realized. However, in this case, the timing of the pump light pulse needs to be matched with that of the optical signal, and therefore, a timing recovery circuit needs to be used.

As the pump light, a method for using an optical pulse train with a sufficiently high repetition frequency as compared with a bit rate of the optical signal is considered to avoid the above. In this case, as the pump light, an optical pulse train with a fast repetition frequency as compared with a bit rate of the optical signal is used. In addition, the pump light is generated, for example, by a mode-locked semiconductor laser or mode-locked fiber laser oscillating with a desired repetition frequency. Alternatively, the pump light may be generated by a LiNbO$_3$ intensity modulator or electro-absorption (EA) modulator.

When a waveform shaper operating as an optical limiter amplifier is used as the waveform shaper, it can be applied to signal light subjected to optical intensity modulation, optical phase modulation, or optical frequency modulation. When a waveform shaper that carries out waveform-shaping by frequency chirp is used as the waveform shaper, it can be applied to signal light mainly subjected to the optical intensity modulation.

In the phase-modulated signal light, phase noise itself is not suppressed by the waveform shaper operating as an optical limiter amplifier. When reducing intensity fluctuation, an optical S/N ratio is improved and at the same time, the phase noise generated due to the intensity fluctuation is effectively reduced. Particularly, in the optical fiber transmission, the intensity noise is converted into the phase noise by a nonlinear optical effect within the optical fiber (amplitude modulation (AM)/phase modulation (PM) conversion). Accordingly, when the intensity noise is suppressed by using the optical signal processor of FIG. 13, the phase noise generated due to the AM/PM conversion is also reduced, and quality of the optical phase modulated signal light is improved. Further, since the optical S/N ratio can also be improved, the signal light can be transmitted with high quality.

With regard to the suppression of fluctuation of zero level, the waveform shaper 3 illustrated in FIG. 9 is effectively used. In addition to the above, for example, when a saturable absorber is disposed at the pre-stage or post-stage of the waveform shaper 3 of FIG. 13, the fluctuation can be suppressed. Examples of the saturable absorber include a semiconductor saturable absorber, a semiconductor amplifier, a Mach-Zehnder interferometer optical switch, and a nonlinear optical loop mirror.

According to the above-described optical signal processor, power loss can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:
1. An optical signal processor comprising:
a light source to supply light having a wavelength different from that of signal light;
a light modulator to multiplex the light produced from the light source and the signal light to supply the multiplexed light and signal light to a nonlinear optical medium, and modulate the light by an intensity change of the signal light in the nonlinear optical medium; and
a demultiplexer to demultiplex modulated wavelength-multiplexed light produced from the light modulator into individual wavelengths,
wherein the light is wavelength multiplexed light having a wavelength different from a wavelength of the signal light.

2. The optical signal processor according to claim 1, further comprising a waveform shaper to waveform-shape the signal light, and supply the waveform-shaped signal light to the light modulator.

3. The optical signal processor according to claim 2, wherein:
the waveform shaper includes:
a nonlinear optical medium for shaping to which the signal light and pump light having a wavelength different from a wavelength of the signal light are supplied;
a first power controller provided on an input side of the nonlinear optical medium for shaping, to control power of the pump light so that a predetermined gain is acquired in the nonlinear optical medium for shaping; and
a second power controller provided on the input side of the nonlinear optical medium for shaping, to control power of the signal light so that a gain due to the pump light is saturated in the nonlinear optical medium for shaping.

4. The optical signal processor according to claim 3, further comprising a polarization controller to control the signal light and the pump light to have predetermined polarization states.

5. The optical signal processor according to claim 3, wherein:
the nonlinear optical medium for shaping includes first and second cascade-connected optical fibers;
the optical signal processor further comprises:
a first polarization controller to supply first pump light to the first optical fiber, and
a second polarization controller to supply second pump light to the second optical fiber; and
the first and second polarization controllers control the first and second pump light so as to have polarization states orthogonal to each other.

6. The optical signal processor according to claim 2, wherein:
the waveform shaper includes an optical circuit having:
an optical separation combiner to separate the signal light and pump light produced from a first port from each other into a linear polarization to guide the separated signal light and pump light to second and third ports, and polarization-combine the signal light and pump light produced from the second and third ports to produce the polarization-combined signal light and pump light from a fourth port;
a nonlinear optical medium for shaping provided between the second and third ports of the optical separation combiner; and
a polarization controller to control a polarization state of the pump light.

7. The optical signal processor according to claim 6, wherein:
the waveform shaper includes a post-stage optical circuit on an output side of the optical circuit, the post-stage optical circuit having a same circuit configuration as the optical circuit; and
a polarization of the pump light used in the post-stage optical circuit is different by 45 degrees from a polarization of the pump light used in the optical circuit.

8. The optical signal processor according to claim 2, wherein:
the waveform shaper includes:
a nonlinear optical medium for shaping;
a polarizer provided on an output side of the nonlinear optical medium for shaping;
a first polarization controller provided on an input side of the nonlinear optical medium for shaping, to control the signal light supplied to the polarizer so as to have a polarization state orthogonal to a polarization main axis of the polarizer;
a second polarization controller provided on the input side of the nonlinear optical medium for shaping, to control pump light so as to have a polarization state different only by a predetermined state from a polarization state of the signal light; and
a power controller to optically amplify the signal light to have a same polarization state as the pump light within the nonlinear optical medium for shaping, and control power of the signal light, the pump light or a combination thereof so as to saturate an optical amplification gain of the signal light within the nonlinear optical medium for shaping.

9. The optical signal processor according to claim 2, wherein:
the waveform shaper includes:
a nonlinear optical medium for shaping to which the signal light is supplied;
an optical amplifier to amplify power of the signal light so that the signal light may acquire frequency chirp in the nonlinear optical medium for shaping; and
a filter to pass a predetermined band among spectra of the signal light expanded by the frequency chirp.

10. The optical signal processor according to claim 9, further comprising an optical demodulator to demodulate the signal light of phase modulated light to intensity modulated light, and supply the demodulated intensity modulated light to the nonlinear optical medium for shaping.

11. The optical signal processor according to claim 2, wherein:
the waveform shaper waveform-shapes the signal light of phase modulated light; and
the optical signal processor further comprises an optical demodulator to demodulate the signal light waveform-shaped by the waveform shaper to intensity modulated light, and supply the demodulated intensity modulated light to the light modulator.

12. The optical signal processor according to claim 2, further comprising:
a monitor circuit to monitor quality of the signal light produced from the waveform shaper and quality of modulated light produced from the light modulator;
a comparator circuit to compare the quality monitored by the monitor circuit and a predetermined threshold;
a power control circuit to control power controllers of the waveform shaper and the light modulator based on comparison results of the comparator circuit; and
a polarization control circuit to control polarization controllers of the waveform shaper and the light modulator based on comparison results of the comparator circuit.

13. The optical signal processor according to claim 1, wherein:
a wavelength of the light is set to a free wavelength of wavelength multiplexed light transmitted in an optical network; and
the optical signal processor further comprises a multiplexer to multiplex modulated light produced from the light modulator with the wavelength multiplexed light.

14. The optical signal processor according to claim 1, wherein:
a wavelength of the wavelength multiplexed light is set to a free wavelength of two or more transmitted wavelength-multiplexed light transmitted in two or more optical networks; and
the optical signal processor further comprises a multiplexer to multiplex the modulated wavelength-multiplexed light of each wavelength obtained by the demultiplexer with a respective one of the two or more transmitted wavelength-multiplexed light.

15. The optical signal processor according to claim 1, wherein:
the light modulator includes:
a polarizer provided on an output side of the nonlinear optical medium;
a first polarization controller provided on an input side of the nonlinear optical medium, to control the light supplied to the polarizer so as to have a polarization state orthogonal to a polarization main axis of the polarizer; and
a second polarization controller provided on the input side of the nonlinear optical medium, to control the signal light so as to have a polarization state different only by a predetermined state from a polarization state of the light.

16. The optical signal processor according to claim 1, wherein:
the light modulator includes:
a polarization controller provided on an input side of the nonlinear optical medium, to control the signal light supplied to the nonlinear optical medium so as to have a polarization state matching a polarization state of the light; and
a filter provided on an output side of the nonlinear optical medium, to extract idler light of the light generated in the nonlinear optical medium.

17. The optical signal processor according to claim 1, wherein:
the light modulator includes:
a polarization controller provided on an input side of the nonlinear optical medium, to control the signal light supplied to the nonlinear optical medium so as to have a polarization state matching a polarization state of the light; and
a power controller provided on the input side of the nonlinear optical medium, to control power of the signal light so that the light is subjected to optical phase modulation in the nonlinear optical medium.

18. The optical signal processor according to claim 1, wherein the signal light is received from a first optical network, and modulated light produced from the light modulator is supplied to a second optical network different from the first optical network.

* * * * *